(12) United States Patent
Appel et al.

(10) Patent No.: US 10,047,308 B2
(45) Date of Patent: Aug. 14, 2018

(54) GASIFIER SYSTEM

(71) Applicant: Ag Energy Solutions, Inc., Spokane, WA (US)

(72) Inventors: Philip W. Appel, Cheney, WA (US);
Thomas D. Weir, Pullman, WA (US);
Jacob M. Culley, Spokane, WA (US);
Sarah E. Love, Spokane, WA (US);
Daniel A. Howard, Cheney, WA (US)

(73) Assignee: Ag Energy Solutions, Inc., Spokane Valley, WA (US)

( * ) Notice: Subject to any disclaimer, the term of this patent is extended or adjusted under 35 U.S.C. 154(b) by 44 days.

(21) Appl. No.: 15/262,910

(22) Filed: Sep. 12, 2016

(65) Prior Publication Data

US 2017/0073593 A1    Mar. 16, 2017

Related U.S. Application Data

(60) Provisional application No. 62/216,464, filed on Sep. 10, 2015.

(51) Int. Cl.
*C10J 3/72* (2006.01)
*C01B 3/02* (2006.01)

(52) U.S. Cl.
CPC ...... *C10J 3/72* (2013.01); *C01B 3/02* (2013.01); *C10J 2300/0916* (2013.01); *C10J 2300/1625* (2013.01)

(58) Field of Classification Search
CPC .................................. C01B 3/02; C10J 3/72
See application file for complete search history.

(56) References Cited

U.S. PATENT DOCUMENTS

| | | |
|---|---|---|
| 8,423,899 B1 | 4/2013 | Crane |
| 8,528,490 B1 | 9/2013 | Dueck |
| 2015/0059245 A1 | 3/2015 | Appel |

*Primary Examiner* — Douglas Bryant Call
(74) *Attorney, Agent, or Firm* — Neustel Law Offices

(57) ABSTRACT

A gasifier system for reducing the particle size of non-gas byproducts of the gasification process. The gasifier system generally includes a grinder that permits uninterrupted syngas flow during gasification of biomass that contains high amounts of silica and/or salts. The described system and method incorporates a grinder that breaks apart the resultant non-gas byproducts into finer particles that may be flushed out of a gasifier using the syngas stream. The particles may then be easily separated from the gas stream in a separator and collected in a char or waste bin for removal/disposal.

19 Claims, 22 Drawing Sheets

GASIFIER SYSTEM

CROSS REFERENCE TO RELATED APPLICATIONS

I hereby claim benefit under Title 35, United States Code, Section 119(e) of U.S. provisional patent application Ser. No. 62/216,464 filed Sep. 10, 2015. The 62/216,464 application is currently pending. The 62/216,464 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to a gasifier system for reducing the particle size of non-gas byproducts of the gasification process.

Related Art

Any discussion of the related art throughout the specification should in no way be considered as an admission that such related art is widely known or forms part of common general knowledge in the field.

Biomass gasification is an effective process for converting a waste stream into a valuable commodity. Direct commodities such as synthesis gas (syngas) and biochar are produced during this process, but other indirect commodities can be produced as well. For example, the syngas can be used to generate electricity. The heat produced during gasification may operate a steam turbine, etc. However, not all biomass fuels are easily gasified due to the chemical makeup of the fuel. Biomass fuel sources such as wheat straw have a high silica content. Numerous papers have been published stating that it is impractical, if not impossible, to gasify wheat straw in any long term or ongoing operation because the silica rapidly forms into large chunks as it gasifies during the gasification process. These chunks are known as clinkers, or more properly, slag and are particularly problematic in gasification because they will clog up exit piping and prevent escape of other gases and char from the system. The gasification of other fuels such as so-called "Russian thistle" (*Kali tragus*, which is common to areas such as eastern Washington) results in the formation of salts that similarly chunk-up and clog the system. The result in either or similar cases is poor quality syngas production due to overpressure, interrupted flow, elevated temperatures, and a host of related problems.

SUMMARY

An example embodiment of the present invention is directed to a gasifier system. The gasifier system addresses the problem of non-gas byproduct formation such as slag that results when gasifying high silica containing biofuels (e.g. wheat straw) and salt-chunk formations that result when gasifying other biofuels (e.g. Russian thistle). The system and methods disclosed herein are useful for breaking up the troublesome non-gas byproducts of gasification into particles that are small enough to be flushed through the exit piping of the gasification system. The system incorporates a collection and conveying means that collects the non-gas byproducts from inside the gasifier and conveys them into a grinder that breaks the particles up into smaller, more uniformly sized granules that can be moved along with the exiting syngas and separated into a collection bin. This system and method permit uninterrupted, continuous operation of the gasification system.

There has thus been outlined, rather broadly, some of the features of the gasifier system in order that the detailed description thereof may be better understood, and in order that the present contribution to the art may be better appreciated. There are additional features of the gasifier system that will be described hereinafter and that will form the subject matter of the claims appended hereto. In this respect, before explaining at least one embodiment of the gasifier system in detail, it is to be understood that the gasifier system is not limited in its application to the details of construction or to the arrangements of the components set forth in the following description or illustrated in the drawings. The gasifier system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview.

Figure 2:
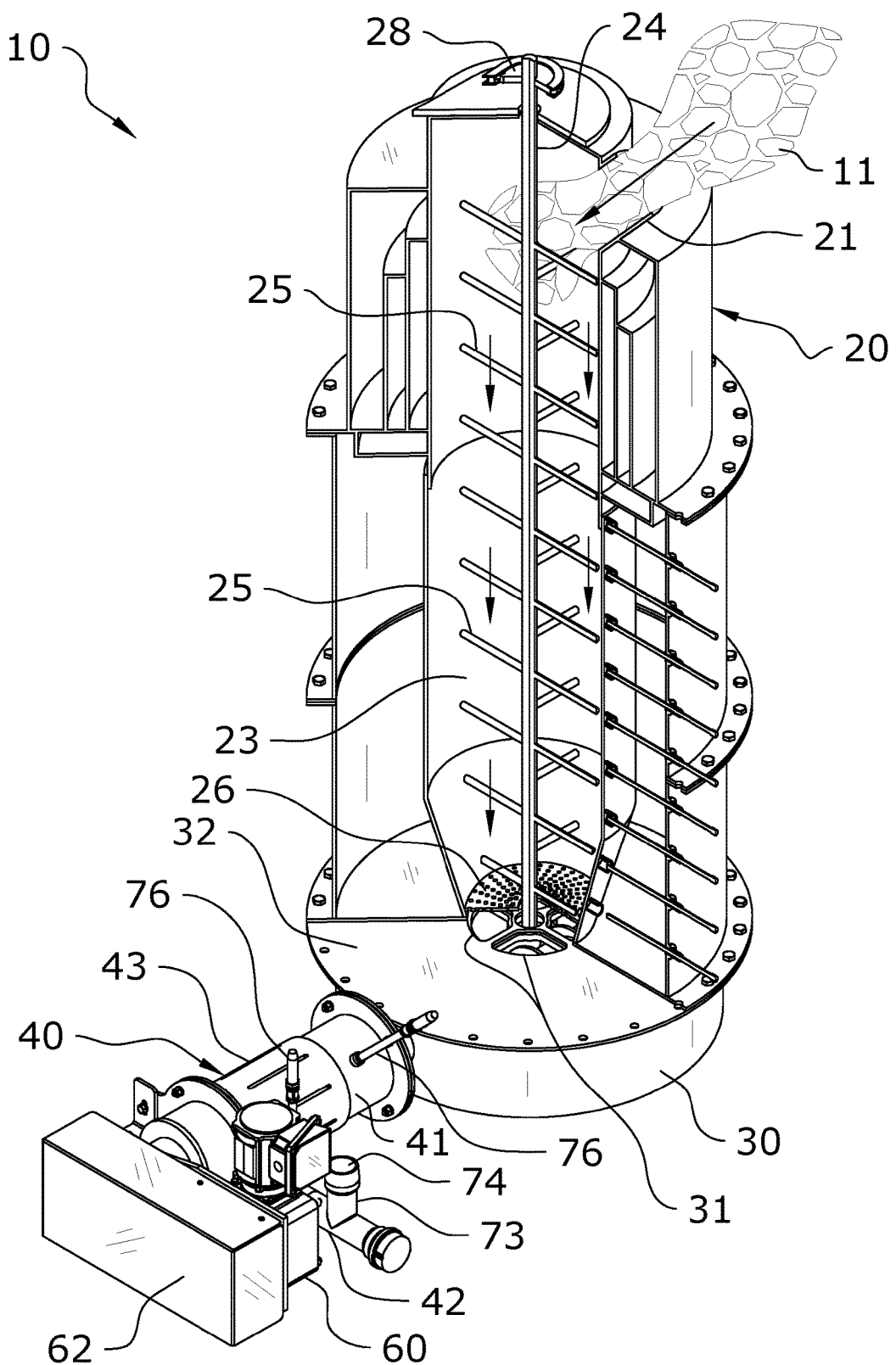
FIG. 2 is a sectional view of a gasifier system in accordance with an example embodiment.
Figure 3:
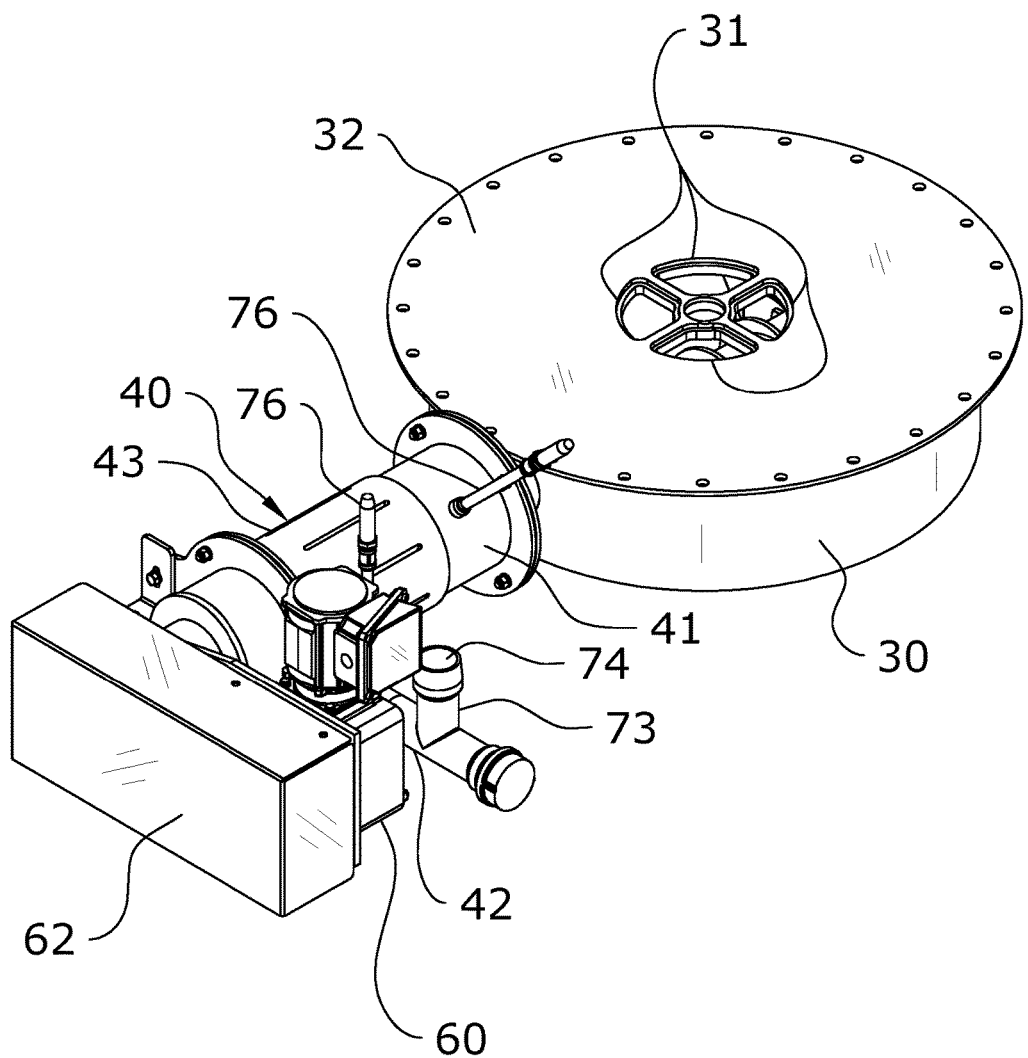
FIG. 3 is a perspective view of a grinder of a gasifier system in accordance with an example embodiment.
Figure 4:
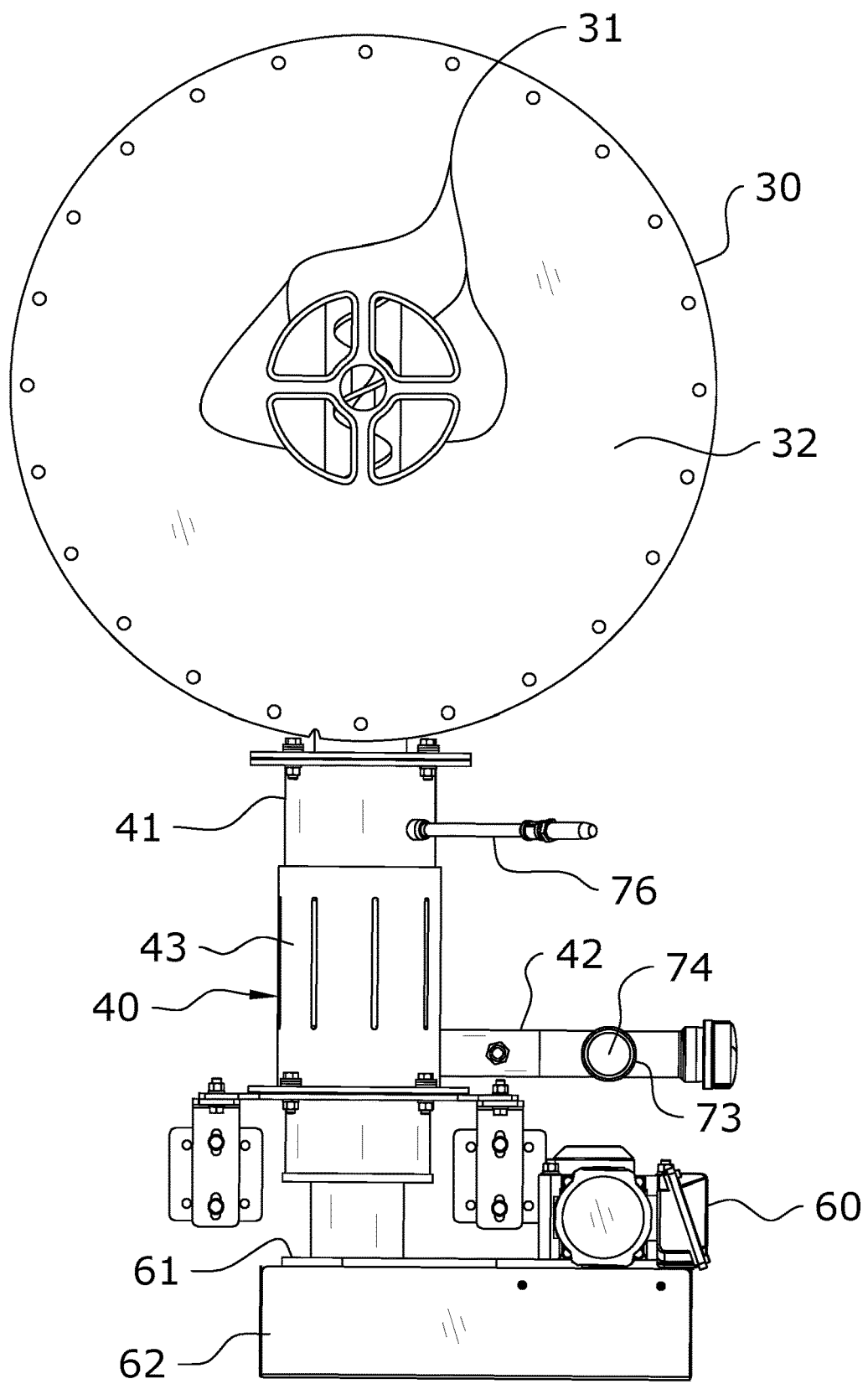
FIG. 4 is a top view of a grinder of a gasifier system in accordance with an example embodiment.
Figure 5:
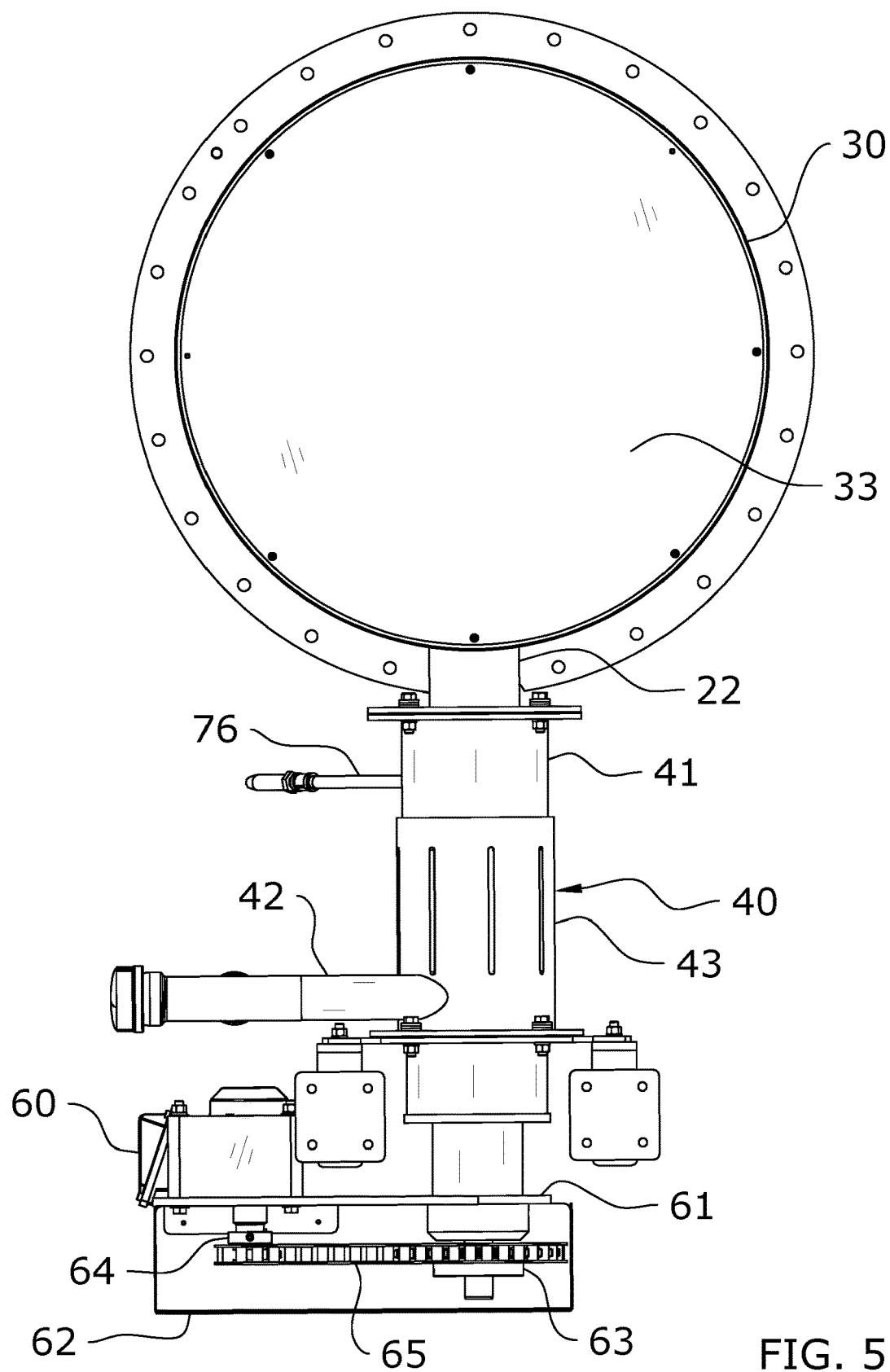
FIG. 5 is a bottom view of a grinder of a gasifier system in accordance with an example embodiment.
Figure 6:
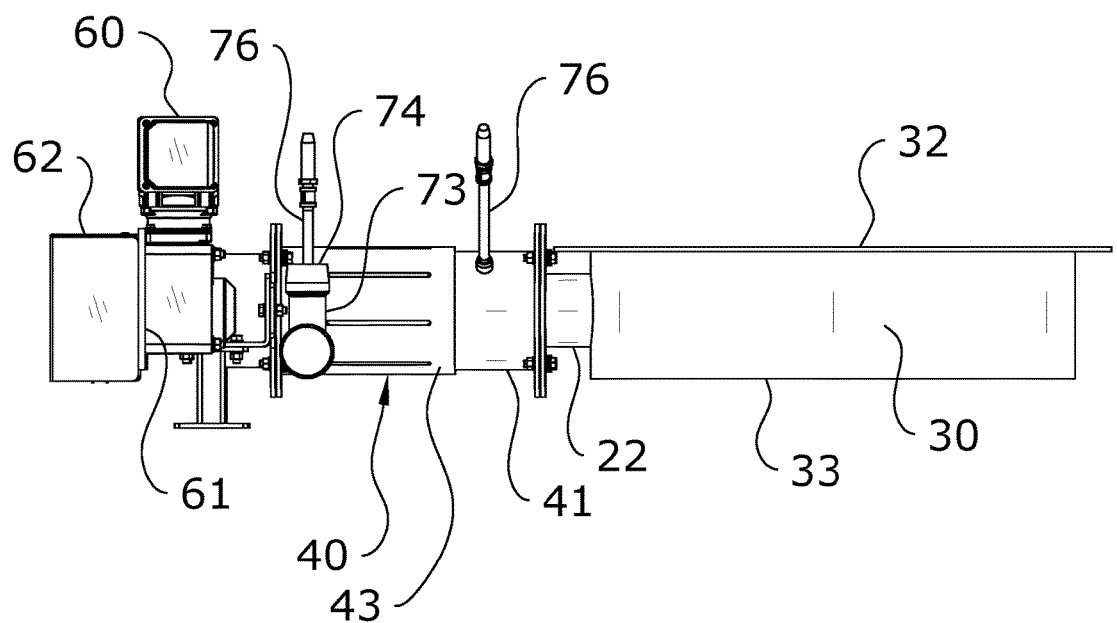
FIG. 6 is a first side view of a grinder of a gasifier system in accordance with an example embodiment.
Figure 7:
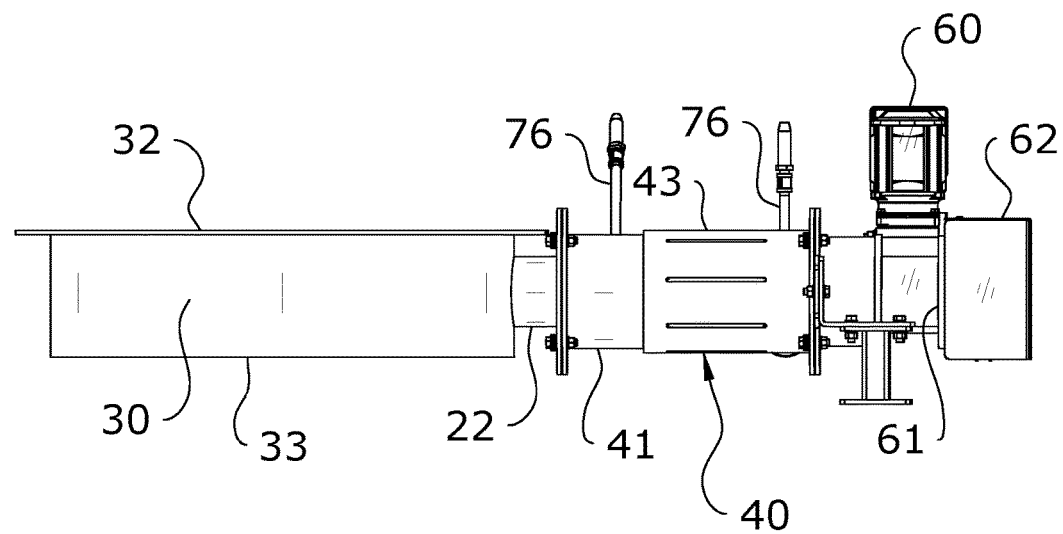
FIG. 7 is a second side view of a grinder of a gasifier system in accordance with an example embodiment.
Figure 8:
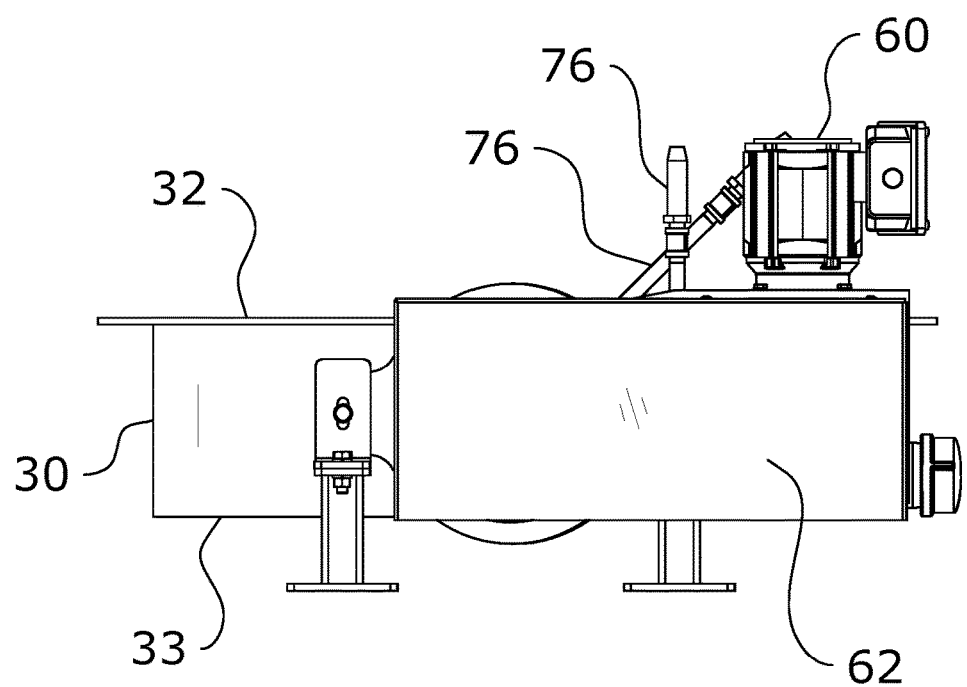
FIG. 8 is a frontal view of a grinder of a gasifier system in accordance with an example embodiment.

FIG. 2 illustrates an example gasifier system 10 generally comprising a gasifier 20 for gasifying a biomass material 11, wherein the gasifier 20 comprises an inlet 21 and an outlet 22. The inlet 21 of the gasifier 20 is adapted to receive the biomass material 11. The outlet 22 of the gasifier 20 is adapted to output a flow of a syngas and a non-gas byproduct 12 having an initial particle size.

FIG. 2 further illustrates an example gasifier system 10 also generally comprising a grinder 40 including an inlet 41 and an outlet 42. The inlet 41 of the grinder 40 is fluidly connected to the outlet 22 of the gasifier 20 for receiving the flow from the outlet 22 of the gasifier 20. The grinder 40 is adapted for grinding the non-gas byproduct 12 from the gasifier 20 into a reduced particle size. The outlet 42 of the grinder 40 is adapted to output a combined flow of the syngas and the non-gas byproduct 13 having the reduced particle size, wherein the reduced particle size of the non-gas byproduct 13 is smaller than the initial particle size of the non-gas byproduct 12.

B. Gasifier.

The systems and methods described herein are adapted to be used with a wide range of different types of gasifiers 20. By way of example and without limitation, the systems and methods disclosed herein may be used in conjunction with, and as a part of the gasifier and/or gasification system disclosed and described in U.S. Patent Publication 2015/0059245 to Appel, et al. (hereinafter referred to as the '245 application), which is hereby incorporated by reference herein in its entirety. As a further example, the systems and methods disclosed herein may be used in conjunction with, and as a part of the multi-chamber gasifier and/or gasification system disclosed and described in U.S. Pat. No. 8,528,490 to Dueck, et al., which is hereby incorporated by reference herein in its entirety. For example, the gasifier 20 could comprise a primary chamber or a secondary chamber of an overall gasifier system. In such an embodiment, the grinder 40 could be attached to either the primary chamber or the secondary chamber (or, any additional chambers that may be present).

Figure 1:
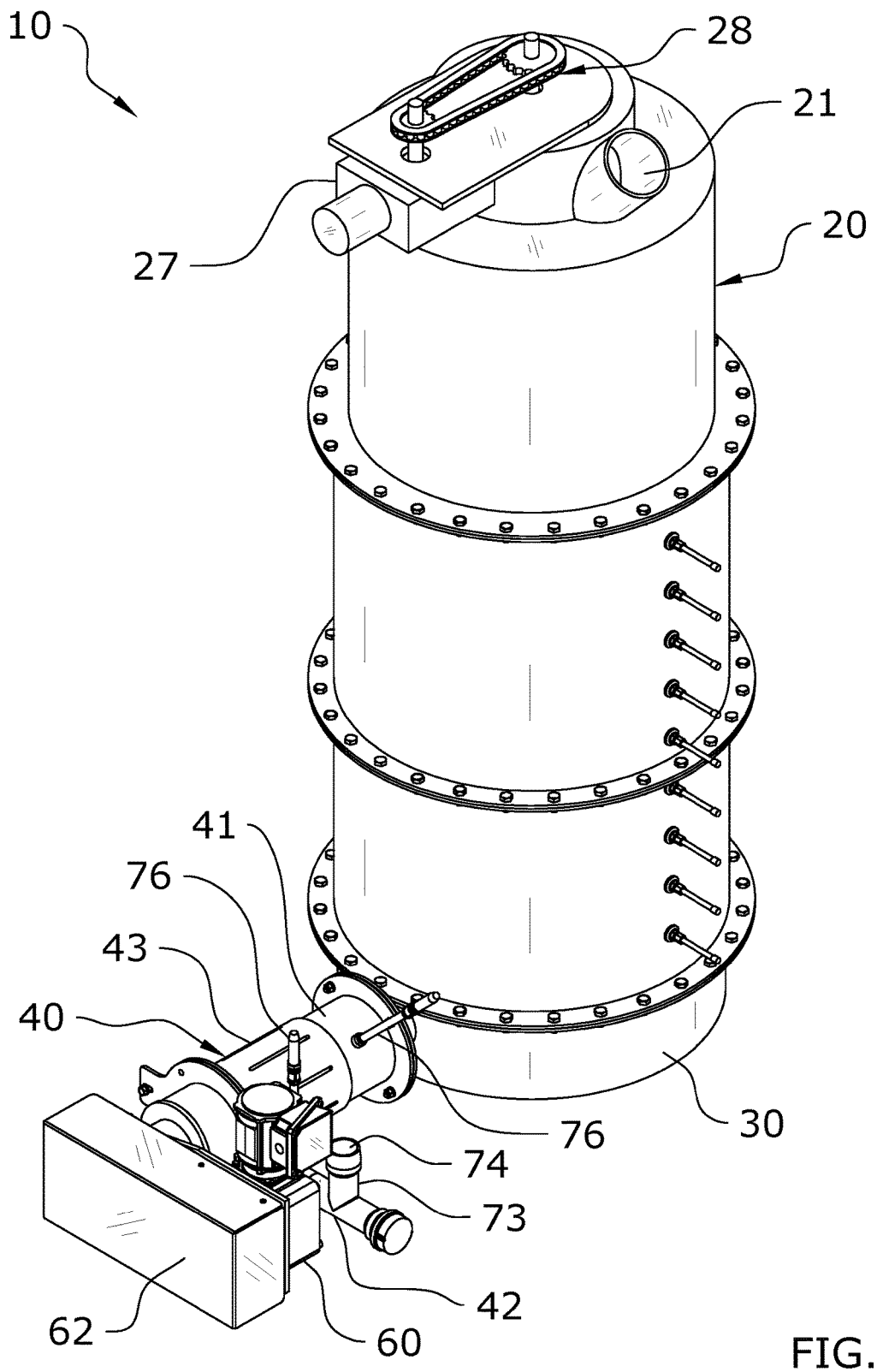
FIG. 1 is a perspective view of a gasifier system in accordance with an example embodiment.

An exemplary gasifier 20 is shown in FIG. 1. However, this exemplary configuration and the accompanying description thereof should not be construed as limiting in any manner as it is merely for exemplary purposes. In this exemplary arrangement, biomass material 11 enters the gasifier 20 at or near the top of the gasifier 20, and is moved through to the bottom as the biomass material 11 undergoes thermal decomposition during gasification.

With reference to FIG. 1, a gasifier 20 for gasifying a biomass material 11 is shown which comprises an inlet 21 in which biomass material 11 is fed to be gasified and an outlet 22 through which the resultant syngas and non-gas byproduct 12 are dispensed. The inlet 21 of the gasifier 20 is adapted to receive the biomass material 11. The outlet 22 of the gasifier 20 is adapted to output a flow of syngas and a non-gas byproduct 12. The non-gas byproduct 12 has an initial particle size as it is output from the outlet 22 of the gasifier 20 which is reduced by the grinder 40.

As the biomass material 11 traverses through the gasifier chamber 23, the biomass material 11 is thermally decomposed into materials such as syngas and/or non-gas byproducts 12. A stir rod 24 is rotated by a motor 27; with stir arms 25 sweeping through the biomass material 11 as it traverses the gasifier chamber 23 to be gasified. Generally, the non-gas byproduct 12 will have an initial particle size as it exits the gasifier 20. The grinder 40 is utilized to break down the non-gas byproduct 12 into a reduced particle size as described herein.

It should be appreciated that the methods and systems described herein could be applied to any type of biomass material 11 capable of being gasified, including without limitation forest slash, urban wood waste, lumber waste, wood chips, sawdust, straw, firewood, agricultural residue, dung, coal, wheat straw, Russian thistle, or any other organic material.

It should be appreciated that the methods and systems described herein may be used with any range of non-gas byproducts 12 which result from gasification of a biomass material 11. The non-gas byproducts 12 collected at the bottom of the gasifier 20 may comprise biochar and, depending upon the biomass fuel, slag or chunks of any of various salts, clinkers, etc. Hereinafter these large chunks will be referred to collectively as "non-gas byproducts", although it should be understood that any larger chunks/particles/char/etc. can be crushed using this system 10.

It should also be understood that the system 10 is useful for breaking up "clinkers", which normally result from gasification and/or burning (i.e. thermal decomposition) of biomass materials 11 such as coal. Thus the non-gas byproducts may be referred to as "slag" or alternatively referred to as "clinkers" as it is useful for breaking up these and other similar chunky non-gas byproducts 12 resultant from gasification. Neither term is intended to be limiting, but merely exemplary of the type of particles that may be reduced in size or "crushed" by the system 10 and methods described herein.

FIGS. 1, 2, and 11-14 show an exemplary grinder 40, according to the invention, attached to a bottom portion of a gasifier 20 that is of similar construction as the one(s) disclosed in the '245 application. The receptacle 30 shown in this figure serves as a collection point for non-gas byproducts 12 such as char and slag that results from gasification of biomass material 11.

An exemplary embodiment of a receptacle 30 is shown in FIGS. 3-7 and 9. It should be appreciated that this is merely an exemplary configuration for a receptacle 30. Thus, the shape, size, and configuration of the receptacle 30 should not be construed as limited by the exemplary figures. The receptacle 30 could be integrated with the gasifier 20 or could be a separate structure which is removably attached to the gasifier 20. In some embodiments, the receptacle 30 may be omitted entirely. In such embodiments, the non-gas byproducts 12 are not collected in any receptacle 30, but could instead be fed directly into the grinder 40.

In the exemplary figures, the receptacle 30 is illustrated as comprising a container which is positioned at the bottom of the gasifier 20. The gasifier outlet 22 comprises an opening in the receptacle 30, with the exemplary figures showing the gasifier outlet 22 being positioned on a side of the receptacle 30. This positioning is not meant to be limiting, but is merely for exemplary purposes. The gasifier outlet 22 could be positioned at various other locations along the receptacle 30 or, in embodiments without a discrete receptacle 30, the gasifier outlet 22 could be positioned at any location along the gasifier 20 so long as the biomass materials 11 have been gasified prior to reaching the gasifier outlet 22.

As shown in the figures, the receptacle 30 may comprise a plurality of receptacle openings 31 on its upper end. The positioning, shape, number of, and orientation of the receptacle openings 31 may vary in different embodiments and thus should not be construed as limited by the exemplary figures. In the exemplary figures, the openings 31 comprise wedge-shaped openings arranged to form a circular grid design. The non-gas byproduct 12 will fall through the receptacle openings 31 to be transferred into the grinder 40, such as via an auger 50 as shown in the figures. As discussed below, a sweep plate 26 may be provided to regulate and pre-grind the non-gas byproduct 12 falling into the receptacle openings 31 so as to prevent jamming of the receptacle openings 31.

The receptacle 30 may comprise an upper cover 32 and/or lower cover 33 that may be removed to easily clean out the receptacle 30. In the figures, the lower cover 33 is shown as being removably secured over the bottom end of the receptacle 30. In some embodiments, an upper cover 32 could be removably positioned on the upper end of the receptacle 30. In such embodiments, the receptacle openings 31 would be in the upper cover 32. In some embodiments, both the upper and lower ends of the receptacle 30 may comprise removable covers 32, 34. In other embodiments, an access door (not shown) may be incorporated into the sides of the receptacle 30 to provide access to the interior of the receptacle 30 for cleaning or maintenance.

FIG. 2 illustrates how biomass material 11 moves through such a gasifier 20 as the biomass material 11 is thermally decomposed during the gasification process. As syngas and other hot gases exit the gasifier 20, the resultant non-gas byproduct 12 particles are propelled along the downstream piping as they become entrained in the gas stream. In other words, these gases, which are moving rapidly (approx. 60-130 CFM), convey the non-gas byproducts 12 along and out of the gasifier 20. In order for this to happen, the non-gas byproducts 12 must be broken down into reduced particles that are small enough to become entrained in the gas flow and also small enough to maneuver through the bends and twists of the downstream piping.

One contemplated approach to breaking up the non-gas byproducts 12 is a multi-tiered one. First, these particles must pass through a prescreening sweep plate 26 located at the bottom of the gasifier such as shown in FIG. 2. The prescreening sweep plate 26 may comprise a wedge-shaped screen as shown in the figures, or may comprise various other shapes and configurations. In some embodiments, the prescreening sweep plate 26 may be omitted entirely such that the non-gas byproducts 12 simply fall into the receptacle 30 of the gasifier 20.

The prescreening sweep plate 26 rotates with the stir rod 24 as the stir arms 25 are rotated to provide several functions. First, the sweep plate 26 acts as a gate to prevent all of the generated non-gas byproducts 12 from exiting the gasifier 20 too rapidly (e.g. all at once), so as to overwhelm downstream piping and clog the plumbing/piping. It does this by covering portions of the receptacle openings 31 in the receptacle 30 with a finer meshed screened plate. Second, it prescreens smaller particles of non-gas byproducts 12 via the mesh in the sweep plate 26 (i.e. smaller particles will fall through the openings in the sweep plate 26).

Third, as the prescreening sweep plate 26 rotates, it allows additional/larger amounts of non-gas byproducts 12 and some of the smaller slag particles to escape through receptacle openings 31 and into the receptacle 30. As the prescreening sweep plate 26 rotates, the openings 31 in the receptacle 30 are alternatively exposed (which allow the non-gas byproducts 12 to move into the receptacle 30).

Fourth, as the prescreening sweep plate 26 rotates, larger chunks of non-gas byproducts 12 may fall and become lodged in the exposed opening(s) 31 of the receptacle 30. The falling action happens as a result of the disturbance in the column of gasifying biomass due to rotation of the stir rod 24 and the arms 25 attached thereto (i.e. due to gravity and stirring), as a result of the thermal decomposition process, and as a result of the prescreening sweep plate 26 sweeping materials along the base of the gasifier 20 as it rotates. Thus, the rate of rotation is important to control gasification and exit of the thermally decomposed biomass fuel which includes syngas and non-gas byproducts 12.

Fifth, lodged non-gas byproducts 12 are broken into smaller particles as they are sheared and pushed through the receptacle openings 31 by the rotating prescreening sweep plate 26. The arrangement of the prescreening sweep plate 26 and receptacle openings 31, coupled with the stirring/sweeping action, also permits exiting gases (e.g. syngas) to escape the gasifier 20 unobstructed by ensuring that an adequate flow path is unobstructed at all times. Should the gas flow become obstructed, the system can initiate a stir cycle to remove the obstruction. As is described in the '245 application, the rate the stir rod 24 turns and its cycles are controlled via a motor 27 coupled to the stir rod 24 via a chain and sprocket 28 which is directed by a control system (not shown) that uses various feedback (e.g. temperature, gas flow, pressure, etc.) as parameters for control.

C. Grinder.

The methods and systems described herein rely upon a grinder 40 to reduce the particle size of the non-gas byproduct 12 from the outlet 22 of the gasifier 20. It should be appreciated that the figures and description herein provide merely exemplary grinder 40 embodiments. Thus, one of ordinary skill in the art would recognize many different configurations of grinders 40 which would function with the systems and methods described herein. Any type of grinder 40 capable of reducing the particle size of the non-gas byproduct 12 resulting from gasification of biomass materials 11 in a gasifier 20 could be utilized.

As shown throughout the figures, the grinder 40 will generally comprise a grinder inlet 41 and a grinder outlet 42. The inlet 41 of the grinder 40 is fluidly connected to the outlet 22 of the gasifier 20 for receiving the flow from the outlet 22 of the gasifier 20. The grinder 40 is adapted for grinding the non-gas byproduct 12 from the gasifier 20 into a reduced particle size. The outlet 42 of the grinder 40 is adapted to output a combined flow of the syngas and the non-gas byproduct 13 having the reduced particle size.

The reduced particle size of the non-gas byproduct 13 is smaller than the initial particle size of the non-gas byproduct 12 from the outlet 22 of the gasifier 20. Preferably, the reduced particle size of the non-gas byproduct 13 is small enough to be entrained with the syngas in the combined flow. For some applications, the reduced particle size of the non-gas byproduct 13 is no greater than ⅜ inches. However, other applications or embodiments may reduce the particle size of the non-gas byproduct 12 to a size that is greater than ⅜ inches.

Figure 9:
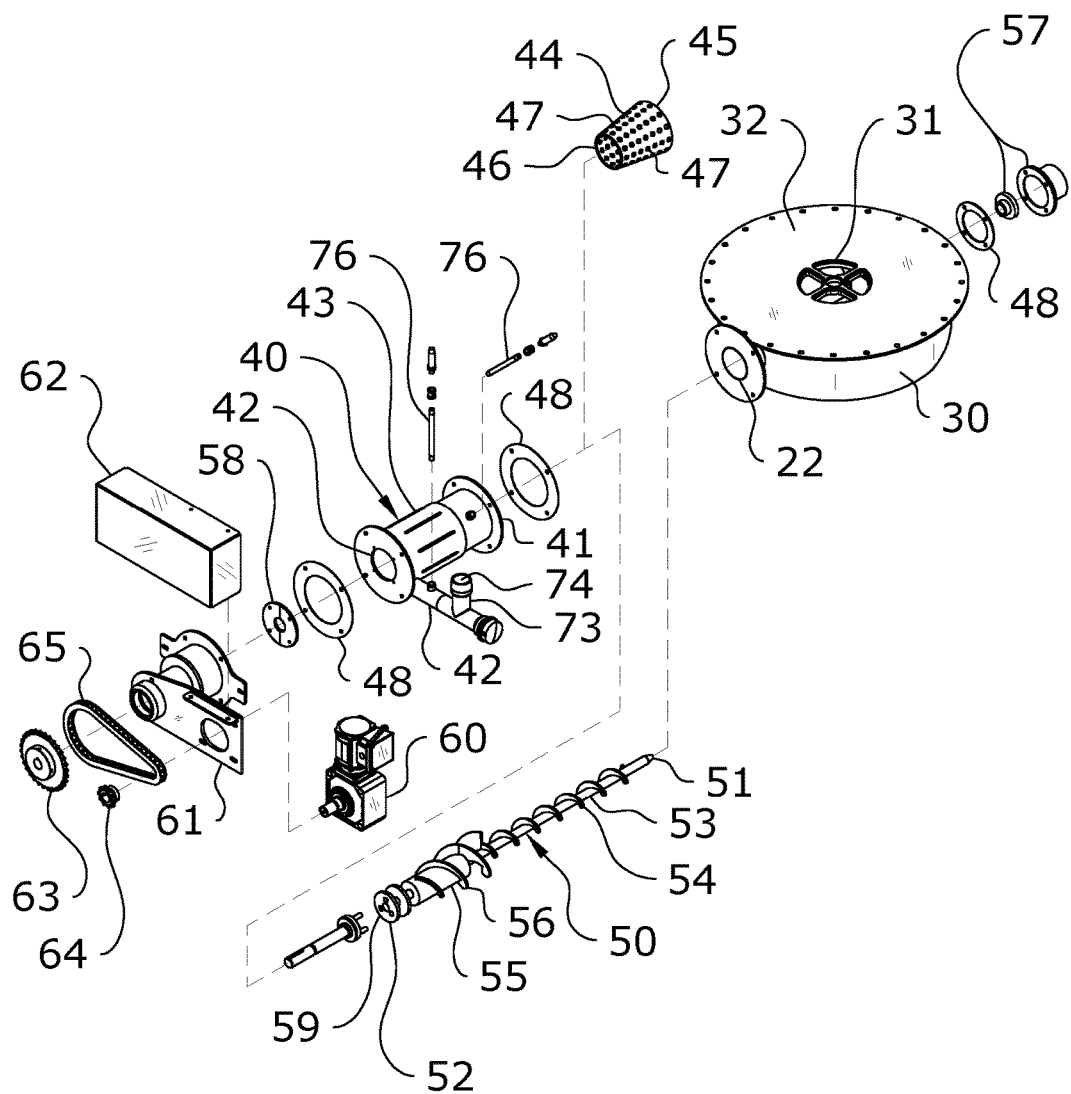
FIG. 9 is an exploded view of a grinder of a gasifier system in accordance with an example embodiment.
Figure 10:
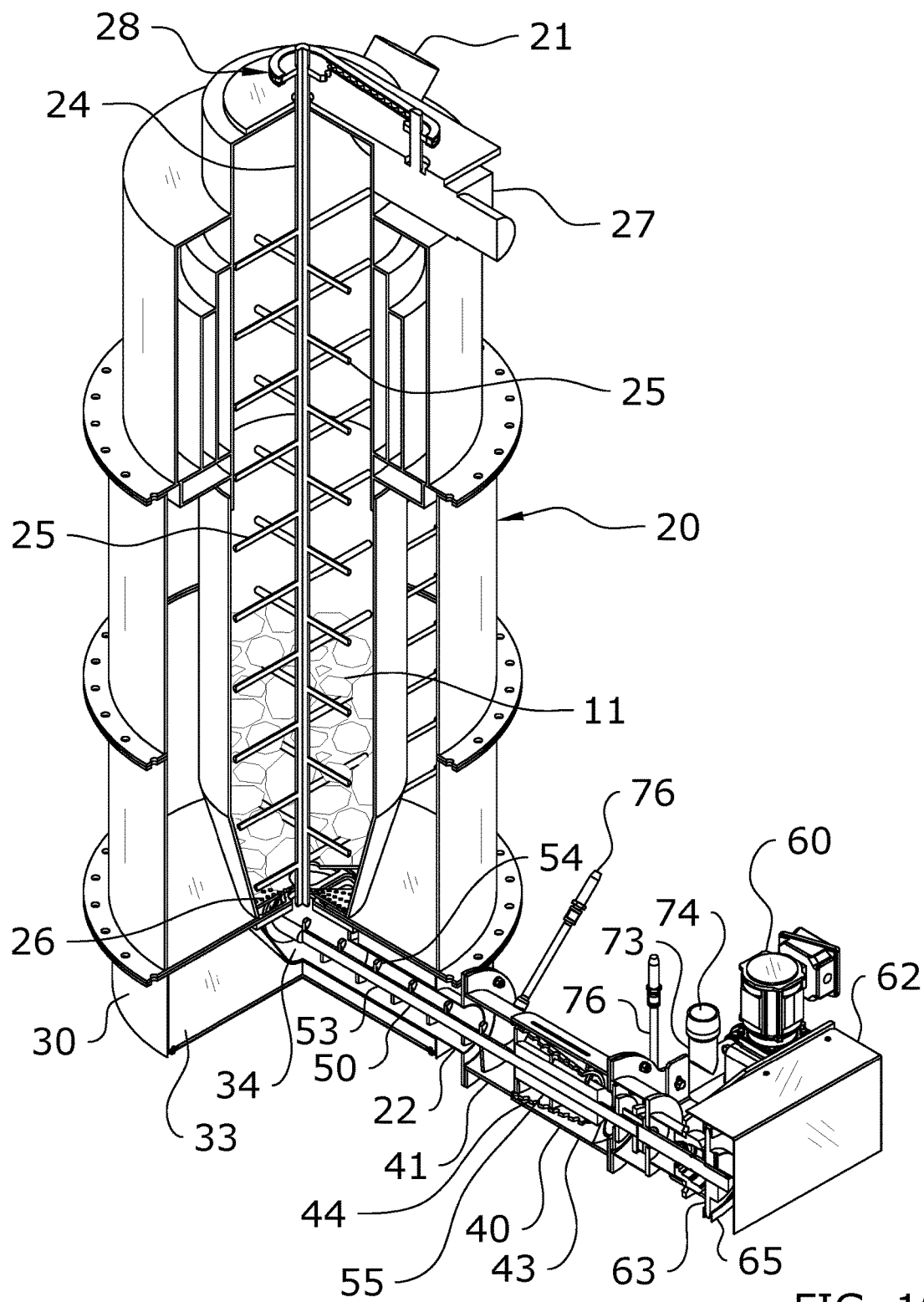
FIG. 10 is a sectional view of a gasifier system in accordance with an example embodiment with non-gas byproducts in the gasifier.

FIG. 9 illustrates exemplary major components of the grinding system in an exploded view. This system represents the second step in the multi-tiered approach to breaking up the non-gas byproduct 12 particles to reduce particle size. Once the non-gas byproducts 12 have entered the receptacle 30, a conveyor such as an auger 50 is used to pull the non-gas byproducts 12 into the grinder 40.

The auger 50 is generally connected between the gasifier 20 and the grinder 40 such that the auger 50 coveys the non-gas byproduct 12 from the gasifier 20 into the grinder 40. Thus, a first end 51 of the auger 50 is generally positioned within the gasifier 20, such as within the receptacle 30, and a second end 52 of the auger 50 passes through the grinder 40 to connect to a motor 60 which rotates the auger 50. The first end 51 of the auger 50 may connect to a bearing 57 which is positioned within the receptacle 30 or externally of the receptacle 30 to allow the auger 50 to rotate when driven by the motor 60.

The auger 50 may comprise a first portion 53 for conveying and a second portion 55 for grinding. The first portion 53 of the auger 50 may comprise a smaller diameter than the second portion 55 of the auger 50. More specifically, the first portion 53 of the auger 50 is adapted to convey the non-gas byproduct 12 from the gasifier 20 into the grinder 40. The second portion 55 of the auger 50 is adapted to force the non-gas byproduct 12 through the grinder 40. The first portion 53 of the auger 50 comprises a first flighting 54 for conveying the non-gas byproduct 12. The second portion 54 of the auger 55 comprises a second flighting 56 adapted for forcing the non-gas byproduct 12 through the grinder 40.

The first portion 53 of the auger 50 extends into the receptacle 30 and conveys the non-gas byproducts 12 particle therein toward the second portion 55 of the auger 50 using a first flighting 54 that acts as a screw conveyor. Once the material has moved to the second portion 55, the second flighting 56 forces the non-gas byproducts 12 against a grinder 40 such as a cone 44. The second flighting 56 is generally larger than the first flighting 54. The rotating and grating action chops and breaks apart the non-gas byproducts 12 into reduced non-gas byproduct 13. This reduced non-gas byproduct 13 may then be entrained in the combined flow with the syngas out of the outlet 42 of the grinder 40.

As shown in FIGS. 9-18, the auger 50 may be rotated by a motor 60 via a drive chain 65 and sprockets 63, 64 to provide the conveying and grinding actions. As best shown in FIG. 9, a motor bracket 61 may be provided to which the motor 60 is mounted. The motor bracket 61 may connect directly with the grinder 40 as shown in the figures. Gaskets 48 may be provided on either side of the grinder 40 to perfect a seal of the grinder chamber 43. The auger 50 may also include a shim disc 58 may be used to adjust the auger's spatial relationship with the grinder 40.

The second end 52 of the auger 50 may include a connector 59 which connects with the motor 60 directly or via a sprocket 64. The motor 60 is generally connected to a first sprocket 63 which is rotated directly by the motor 60. A second sprocket 64 is connected to the first sprocket 63 via a drive chain 65 which transfers rotational movement of the first sprocket 63 to the second sprocket 64. The second sprocket 64 may be connected to the auger 50 via the connector 59.

Various grinder 40 configurations may be utilized and the referenced exemplary figures and exemplary descriptions of different grinder 40 embodiments should not be construed as limiting. While the figures illustrate a grinder 40 comprises a cone structure, various other configurations may be utilized as discussed herein.

In the cone-shaped grinder 40 arrangement shown, the grinder 40 comprises a cone 44 which has a plurality of openings 47 for grinding the non-gas byproduct 12. Though various sizes may be utilized, an exemplary cone 44 has openings 47 that are roughly ⅜ inch in diameter through which the particles of non-gas byproducts 12 must pass. The number, size, orientation, and spacing the openings 47 may vary in different embodiments.

The cone 44 in this arrangement lies within a grinder chamber 43 and comprises a wide end 45 and a narrow end 46. The wide end 45 of the cone 44 is adapted to receive the non-gas byproduct 12 having the initial particle size. The openings 47 of the cone 44 are adapted to dispense the non-gas byproduct 13 having the recued particle size. The exemplary grinder 40 shown is conical shaped, thus larger particles enter the wide end 45 of the cone 44 and are forced toward the narrow end 46. As the non-gas byproducts 12 move across the inner surface of the cone 44, the edges of the non-gas byproducts 12 catch upon the edges of the openings 47 in the cone 44 and are sheared off into smaller granules which traverse through the openings 47 into the grinder chamber 43 and outlet conduit 70.

Since the non-gas byproducts 12 are hot (300 to 600 degrees C.) they may be extruded somewhat through the openings 47 in the cone 44 rather than shearing off (strictly speaking) due to the molten characteristics of the non-gas byproducts 12 at those temperatures. Other, cooler particles however, which will be more brittle, will simply experience shearing at the opening 47 sites, and will also break apart when compressed against the cone 44 generally. Smaller non-gas byproduct 12 particles will be moved right through the openings 47 without being broken apart. The grinder chamber 43 surrounds the cone 44 and contains the gas and granules until they can be moved out into further downstream piping via the outlet conduit 70 as they become entrained in the gas flow.

Once the granules of non-gas byproducts 12 exit the openings 47 in the cone 44, they become entrained in the gas stream and are moved through the syngas/char exit port 74 through downstream piping where they can be separated from the gas using a separator 80 such as a separator.

Various other grinder 40 configurations may be utilized. For example, the grinder 40 could comprise opposing wheels or gears which rotate in relation to each other. The non-gas byproduct 12 is fed between the opposing wheels or gears so that the non-gas byproduct 12 may be ground into a reduced non-gas byproduct 13 to be entrained in a combined flow with syngas. Such a configuration is commonly referred to as a "roll crusher". The opposing wheels or gears could include teeth which aid in grinding the non-gas byproduct 12.

Alternatively, the grinder 40 could comprise opposing jaws which converge so as to crush or grind the non-gas byproduct 12. The jaws could be actuated so as to increase the crushing or grinding action as the non-gas byproduct 12 is conveyed through the jaws. Such a configuration is commonly referred to as a "jaw crusher".

The system 10 may include various probes 76 that monitor temperature and pressures at key points to ensure that no plugging has occurred. These temperature(s) and pressure(s) data are fed back into the control system (not shown) to use as parameters for control of the system 10. Probes 76 may also measure gas flow rate.

Figure 15:
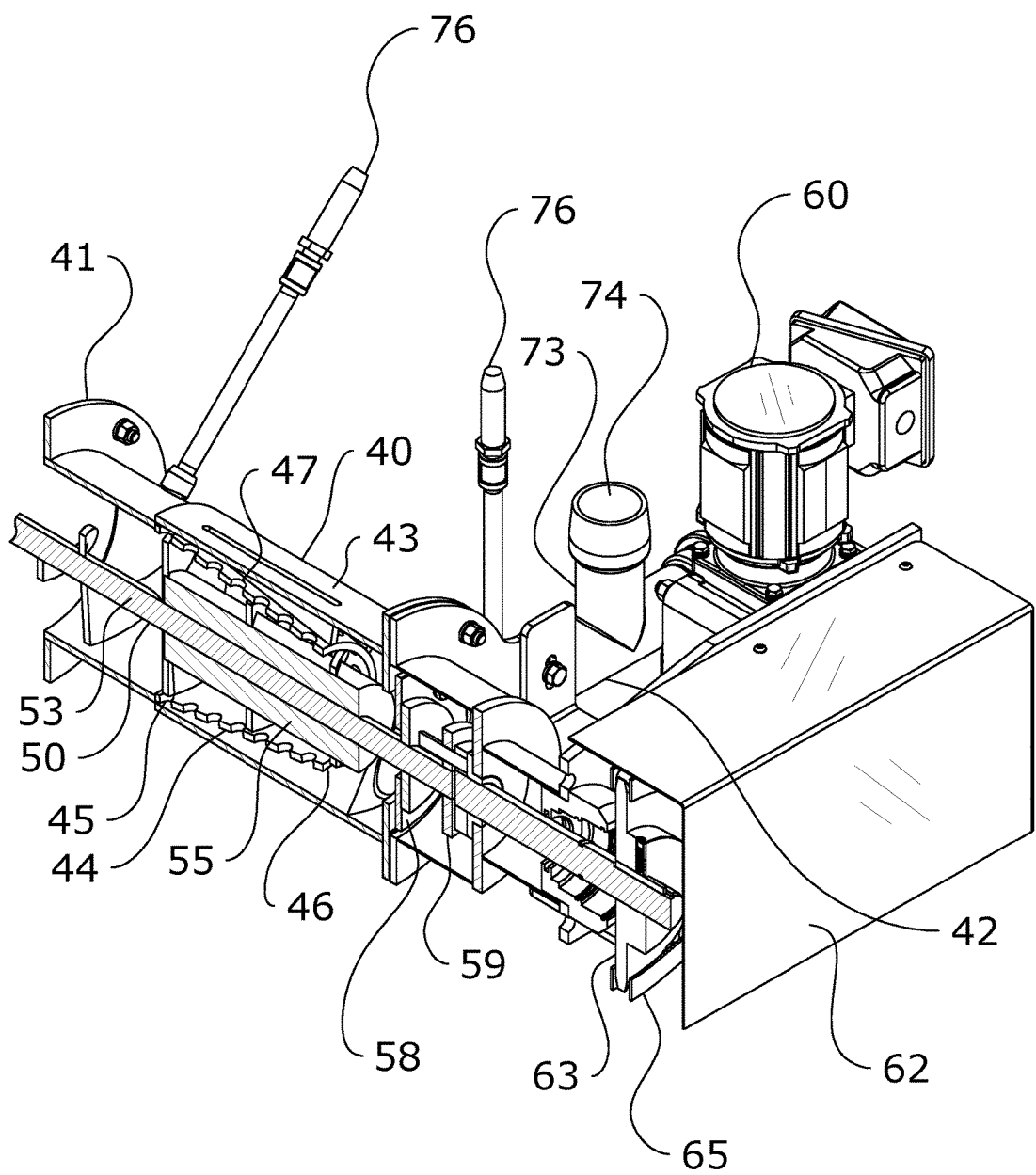
FIG. 15 is a perspective sectional view of the grinder in accordance with an example embodiment.
Figure 16:
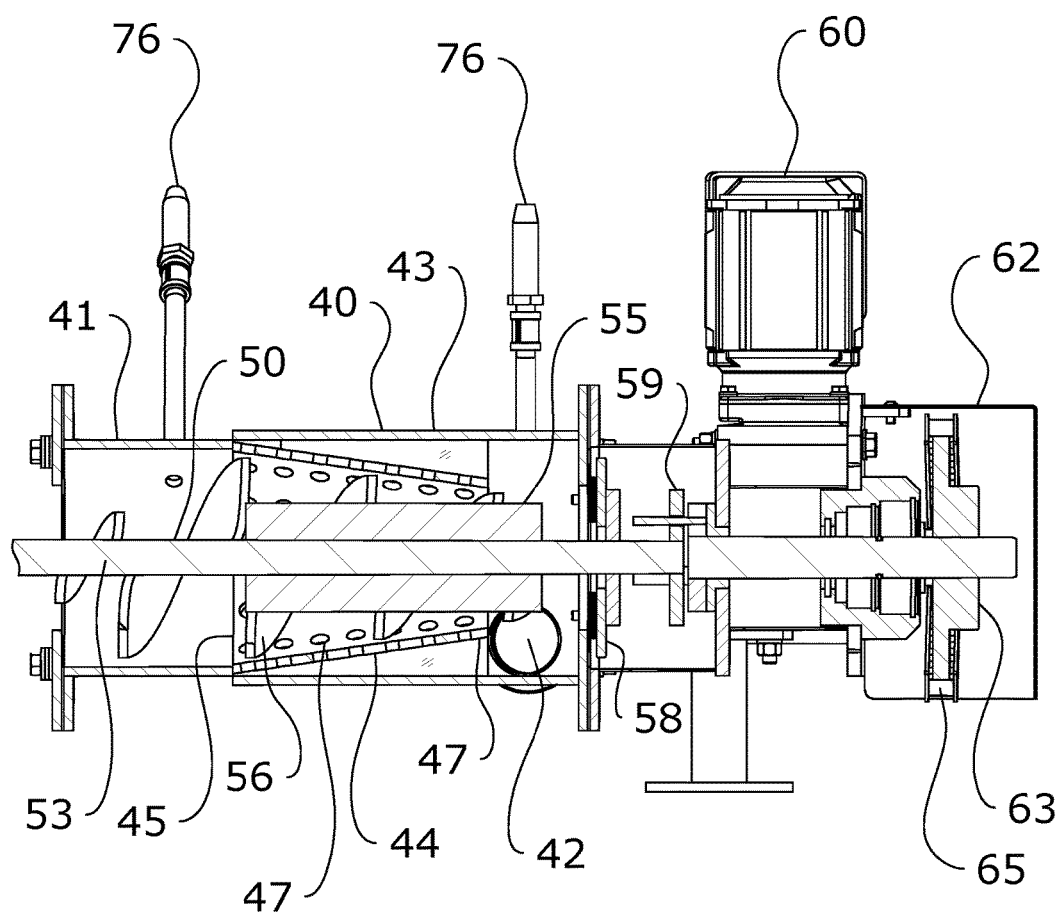
FIG. 16 is a side sectional view of the grinder in accordance with an example embodiment.

The positioning of the probes 76 in the exemplary figures is merely for illustrative purposes. The probes 76 could be positioned at various locations within the gasifier 20, receptacle 30, grinder 40, or any other portion of the system 10 to provide various readings relevant to the overall operation of the system 10. As shown in FIG. 15, probes 76 may be positioned at the inlet 41 and the outlet 42 of the grinder 40.

Figure 14:
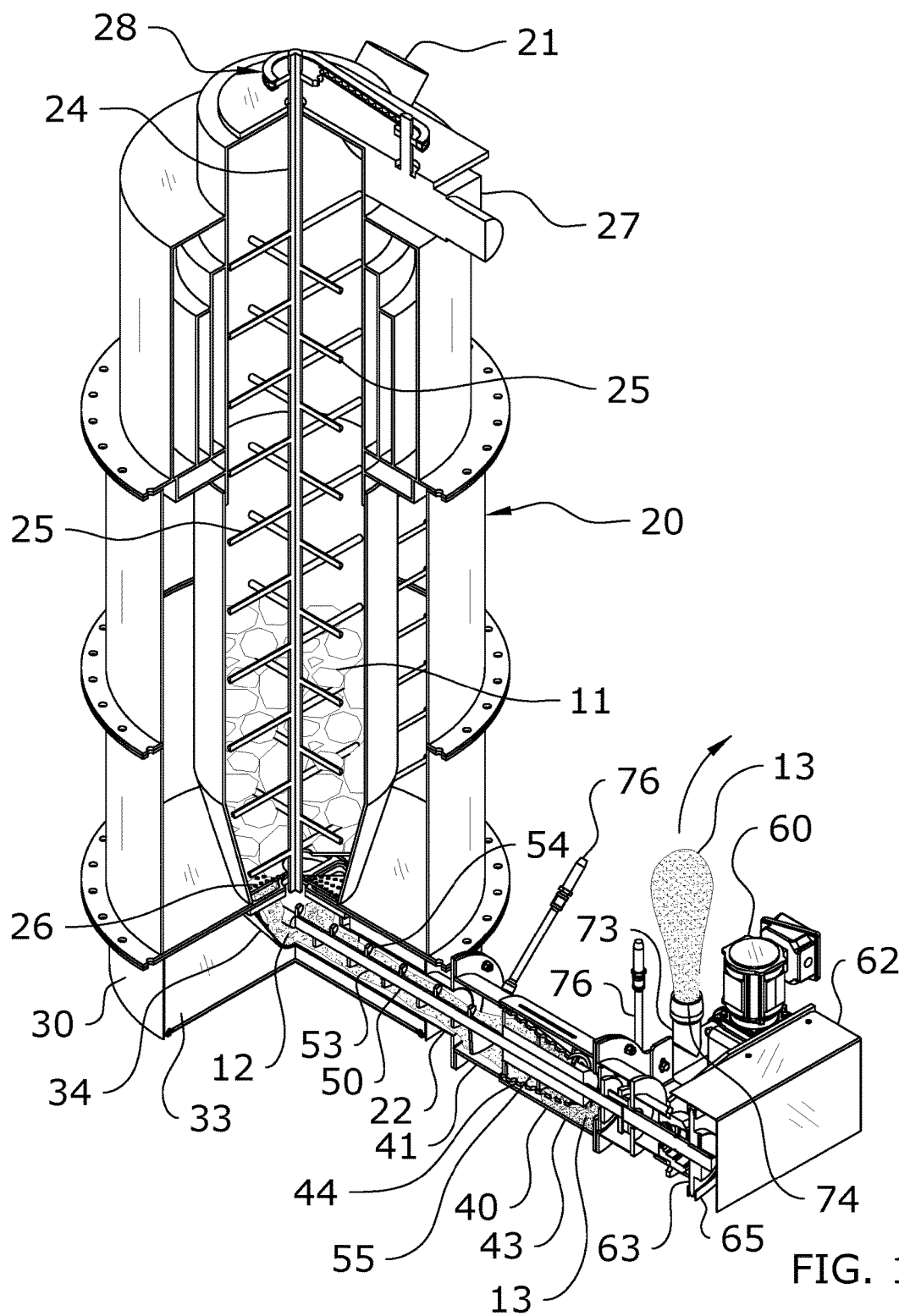
FIG. 14 is a sectional view of a gasifier system in accordance with an example embodiment illustrating the grinder outputting reduced non-gas byproducts.
Figure 19:
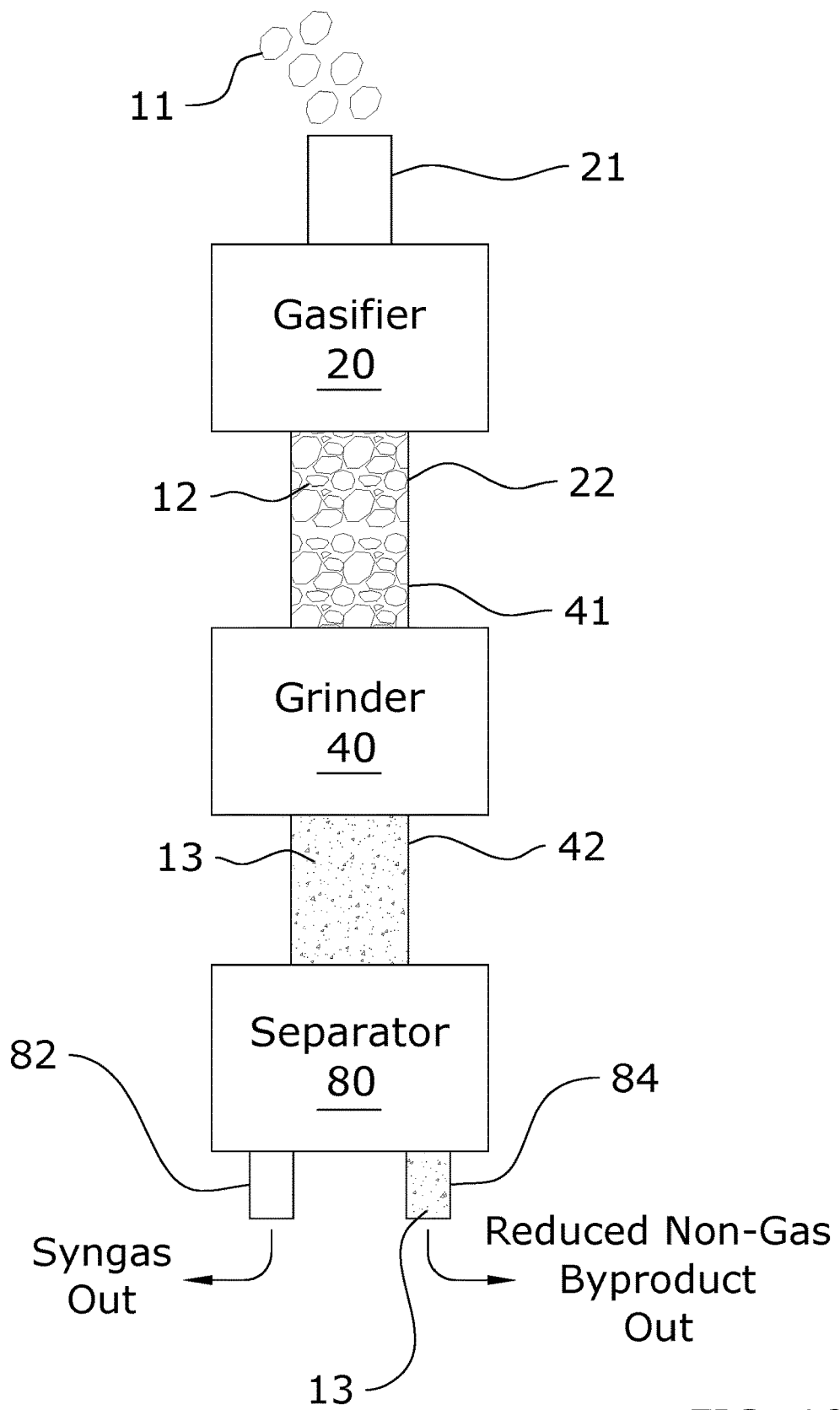
FIG. 19 is a block diagram illustrating a gasifier system in accordance with an example embodiment.

As described herein and shown in FIGS. 14 and 19, the grinder 40 generally outputs a combined flow of syngas and the grinded non-gas byproduct 13 which has a reduced particle size. In some embodiments, however, the syngas may be pulled separately, such as directly from the gasifier 20; with the grinder 40 only receiving non-gas byproduct 12 and outputting the reduced non-gas byproduct 13.

The grinder outlet 42 may comprise an outlet conduit 70, which may lead to another system such as a separator 80 connected to the grinder outlet 42 via the outlet conduit 70 to separate the reduced non-gas byproduct 13 from the syngas. As described in more detail below, the outlet conduit 70 may include a capped-off clean-out port 71 at its distal end. The cap may be removed from the clean-out port 71 to clean out the outlet conduit 70. As described below, residual reduced non-gas byproduct 13 may also collect in the capped-off clean-out port 71 to provide a buffer surface which reduces fatigue on the piping of the outlet conduit 70.

Figure 17:
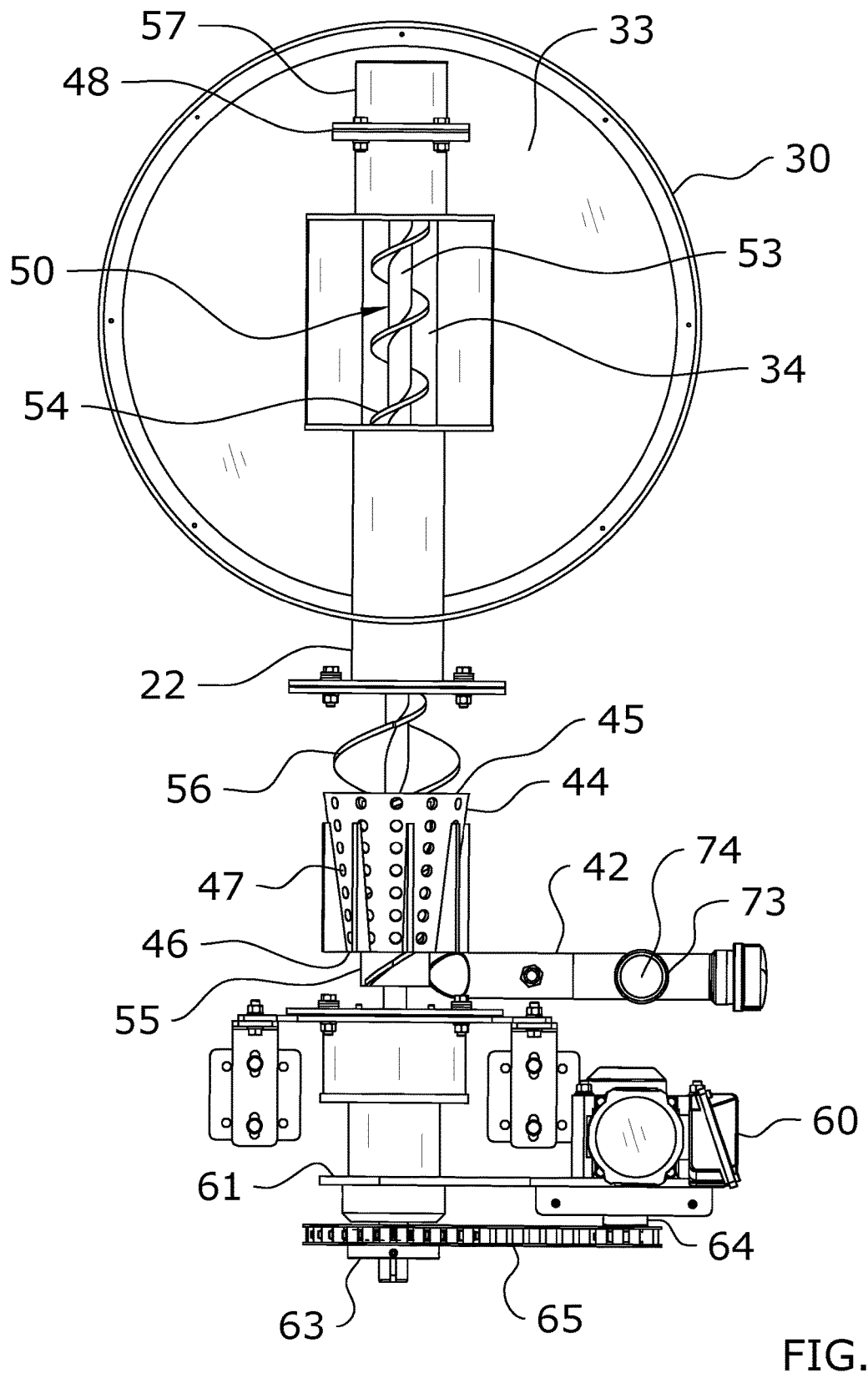
FIG. 17 is a top sectional view of the grinder with covers removed in accordance with an example embodiment.
Figure 18:
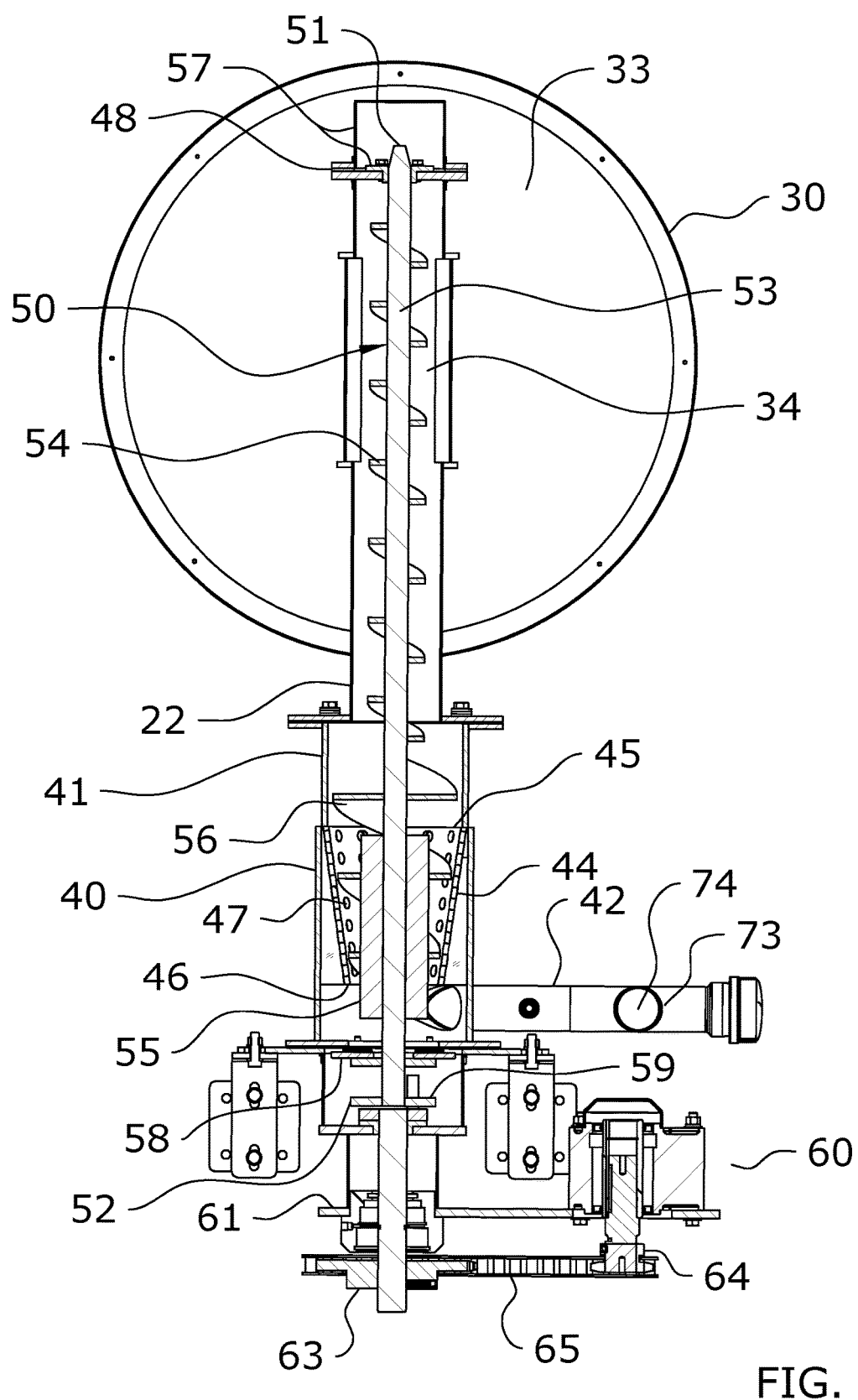
FIG. 18 is a top sectional view of the grinder in accordance with an example embodiment.

As shown in FIGS. 9, 17, and 18, an outlet extension 73 may extend outwardly from the outlet conduit 70 at various locations along its body. The outlet extension 73 may extend outwardly at various angles. In a preferred embodiment as shown in the figures, the outlet extension 73 is fluidly connected to and extends from the outlet conduit 70 at a right angle to form a "T" junction. The distal end of the outlet extension 73 may be used as an outlet port 74 for both the reduced non-gas byproduct 13 and the syngas.

One additional aspect of the piping of an exemplary system 10 according to the invention is the use of "dead head" pipe wall buffering. Because the reduced non-gas byproducts 13 being conveyed in the gas stream are abrasive, they can quickly abrade the piping at bends to the point of breakage/leakage. To prevent this from occurring, the system 10 may incorporate "T" junctions where the inline leg is capped. The short, capped, end of the "T" comprises a clean-out port 71 serves two purposes. First, the clean-out port 71 provides a means for cleanout. Second, during operation the entrained slag and char particles/granules collect in the clean-out port 71 and provide a buffer surface onto which fast moving granules of the reduced non-gas byproduct 13 abut as they maneuver the corner within the "T". This arrangement is much more compact than implementing large sweeps that would otherwise be required to prevent rapid pipe wall deterioration due to abrasion; and the collection of buffering material is automatic.

The materials used in construction of this system 10 are generally those that would be suitable for the high temperatures and pressures experienced in a gasification system. As a non-limiting example, high temperature steel may be used to construct the main shaft, the grates, and other highly stressed components. Similarly, steel is appropriate for components such as the receptacle 30. The piping may be constructed of stainless steel. High temperature insulation, such as alumina blanket may be used to minimize heat loss through system components.

D. Operation of Preferred Embodiment.

Figure 11:
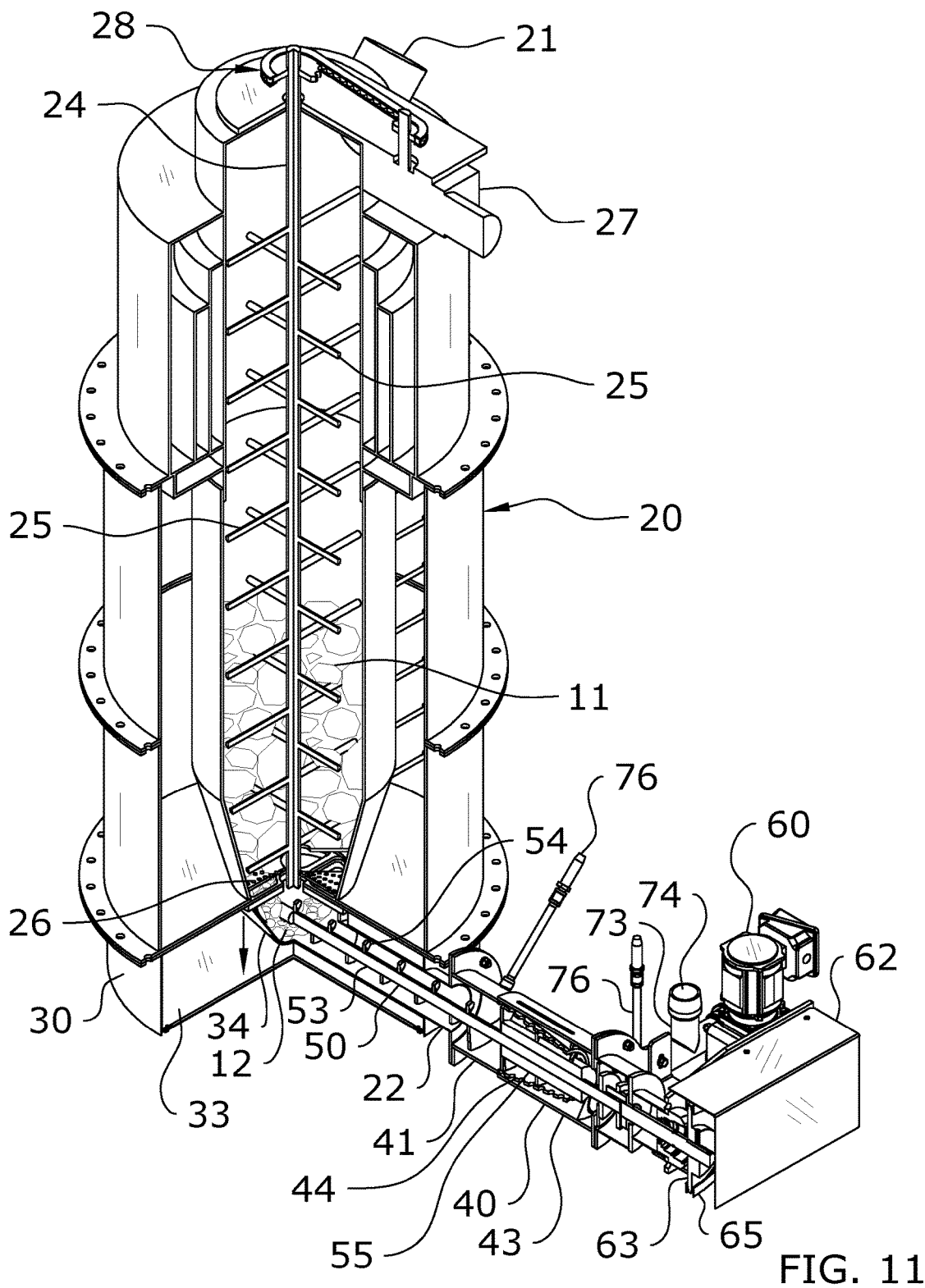
FIG. 11 is a sectional view of a gasifier system in accordance with an example embodiment with non-gas byproducts being output by the gasifier.
Figure 12:
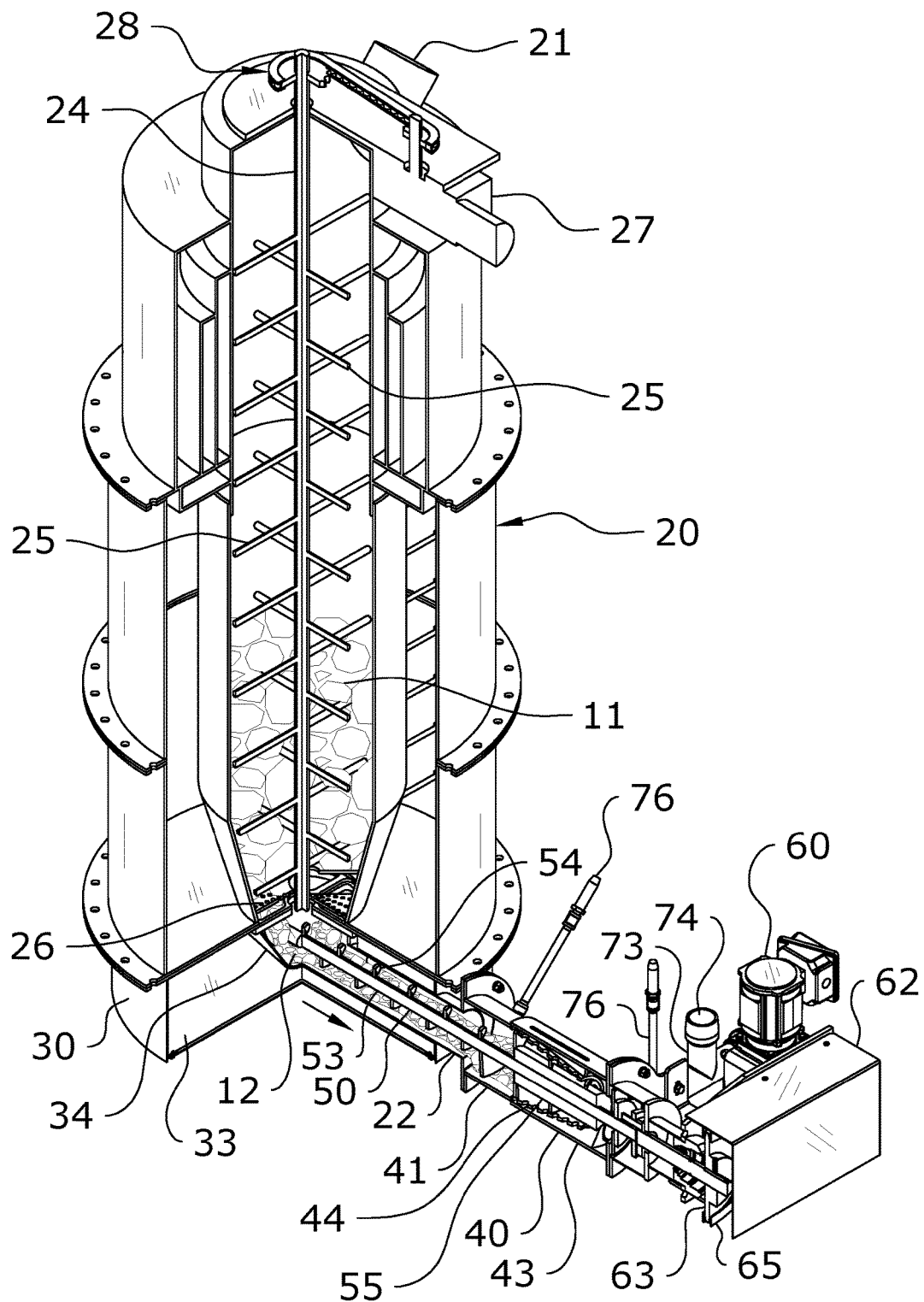
FIG. 12 is a sectional view of a gasifier system in accordance with an example embodiment illustrating the non-gas byproducts being conveyed into the grinder.
Figure 20:
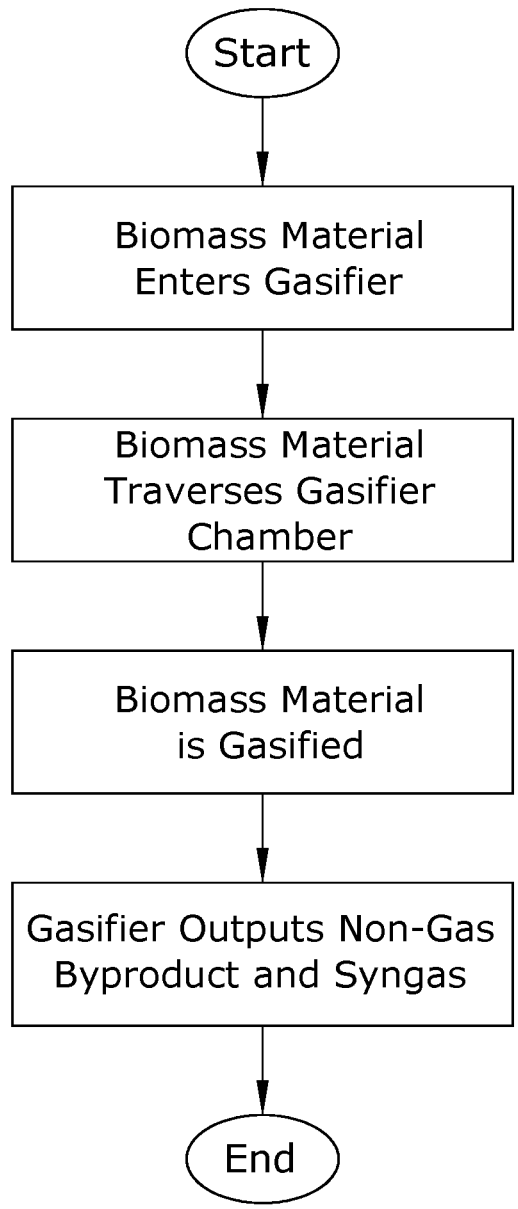
FIG. 20 is a flowchart illustrating an exemplary method of gasifying biomass material.

In use, biomass material 11 is first fed into the inlet 21 of the gasifier 20. The biomass material 11 may be fed into the gasifier 20 in various manners, as the manner in which the biomass material 11 enters the gasifier 20 is not limiting in any way on the functionality of the methods and systems described herein. As the biomass material 11 traverses the gasifier chamber 23 as shown in FIGS. 11 and 12, the biomass material 11 is gasified within the gasifier 20 to produce a flow of both syngas and a non-gas byproduct 12 having an initial, larger particle size. The results of the gasification of the biomass material 11, including the flow of syngas and non-gas byproduct 12, are outputted from the outlet of the gasifier 20. FIG. 20 is a flowchart illustrating an exemplary method of such gasification.

The non-gas byproduct 12 produced by the gasification process will generally comprise large chunks of material which would normally need to be manually cleaned out. In the exemplary embodiment shown in the figures, the non-gas byproduct 12 will fall into a receptacle 30. More specifically, as shown in FIG. 12, the non-gas byproduct 12 will fall through openings 31 on the top of the receptacle 30. As described previously, a sweep plate 26 may be rotated with the stir rod 24 of the gasifier 20 to regulate and break up the non-gas byproduct 12 as it enters the receptacle 30.

Figure 13:
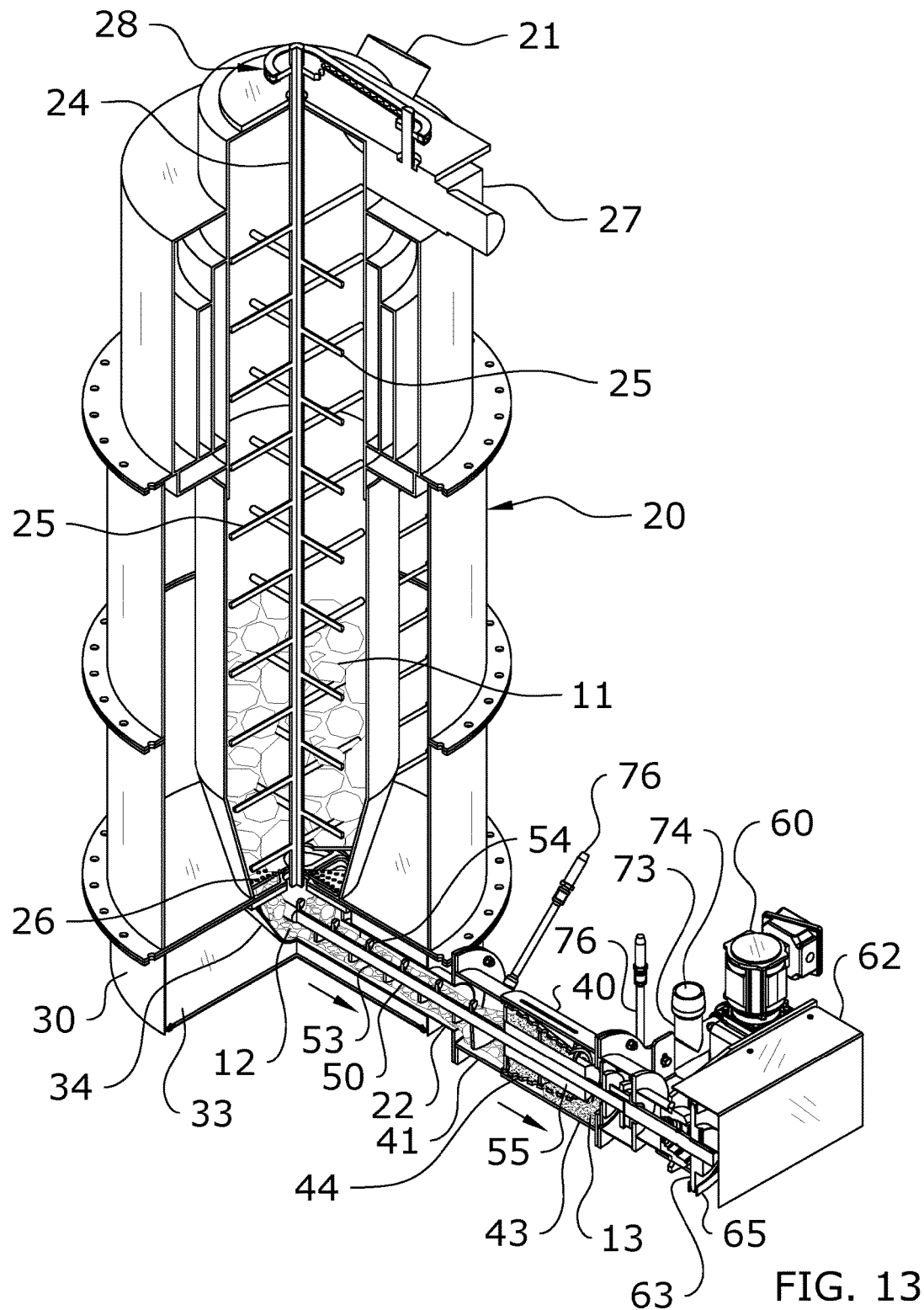
FIG. 13 is a sectional view of a gasifier system in accordance with an example embodiment illustrating the non-gas byproducts being grinded by the grinder.

The flow of the syngas and this non-gas byproduct 12 is transferred from the outlet 22 of the gasifier 20 into the inlet 41 of the grinder 40 as shown in FIGS. 12-14. It should be appreciated that the transfer of the syngas and the non-gas byproduct 12 from the outlet 22 of the gasifier 20 into the inlet 41 of the grinder 40 may be accomplished in various ways. The figures illustrate the use of a conveyor such as an auger 50 to transfer the non-gas byproduct 12 from the gasifier 20 into the grinder 40. Various other types of conveyors could be utilized, such as a push-rod, sweepers, a plunger, compressed air blasts, and the like.

In embodiments utilizing an auger 50, the auger 50 may comprise a first portion 53 which extends into the gasifier 20, such as the receptacle 30. The first portion 53 includes a first flighting 54 of the auger 50 which is adapted to efficiently convey the non-gas byproduct 12 from the gasifier 20 into the grinder 40.

In some embodiments, gravity may be utilized either by itself or in combination with a conveyor to transfer the non-gas byproduct 12 from the outlet 22 of the gasifier 20 into the inlet 41 of the grinder 40. For example, if the grinder 40 is positioned directly beneath the gasifier 20, the non-gas byproduct 12 can be gravity-fed into the grinder 40. As another example, a diagonal chute could be utilized in which gravity will cause the non-gas byproduct 12 to traverse the chute into the grinder 40.

Figure 21:
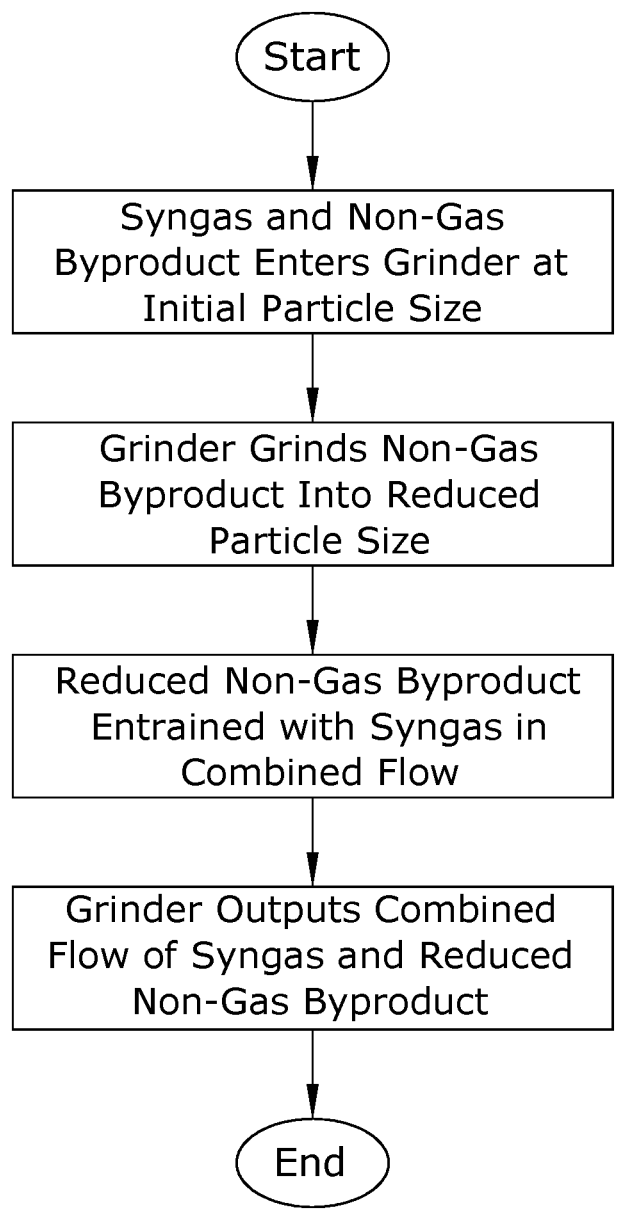
FIG. 21 is a flowchart illustrating an exemplary method of grinding a non-gas byproduct.

As shown in FIGS. 13, 14, and 21, the non-gas byproduct 12 is grinded into a reduced particle size by the grinder 40. As mentioned previously, various types of grinders 40 may be utilized. In the case of the cone 44 shown in the figures, a conveyor such as an auger 50, after conveying the non-gas byproduct 12 from the gasifier 20 into the grinder 40, will force the non-gas byproduct 12 against the grinder 40. The auger 50 may include a second portion 55 which extends into the grinder 40. The second portion 55 includes a second flighting 56 which is adapted to break apart the non-gas byproduct 12 and to force the non-gas byproduct 12 against the grinder 40. The non-gas byproduct 12 will be broken down and sheared by the openings 47 of the grinder 40, with the non-gas byproduct 13 with the reduced particle size being extruded through the openings 47.

In an embodiment which utilizes a jaw crusher or roller crusher for the grinder 40, the conveyor such as an auger 50 may convey the non-gas byproduct 12 into the jaw crusher or roller crusher. As the non-gas byproduct 12 traverses between the rollers (in the case of a roller crusher) or the jaws (in the case of a jaw crusher), the non-gas byproduct 12 will be broken apart to reduce its particle size. In embodiments without a conveyor, the non-gas byproduct 12 may be gravity-fed into and through the grinder 40.

The grinder 40 functions to reduce the particle size of the non-gas byproduct 12 such that the reduced non-gas byproduct 13 has a small enough particle size to become entrained in a combined flow with syngas. By having a small enough particle size to become entrained, the reduced non-gas byproduct 13 will be less likely to become caught or clogged in piping which is downstream of the grinder 40, such as an outlet conduit 70 leading to a separator 80.

As shown in FIG. 14, the reduced non-gas byproduct 13 is generally outputted via the outlet 42 of the grinder 40. In some embodiments, an outlet conduit 70 may be provided which includes a T-shaped junction formed by the outlet conduit 70 and an outlet extension 73 which extends outwardly from a position along the length of the outlet conduit 70.

Figure 22:
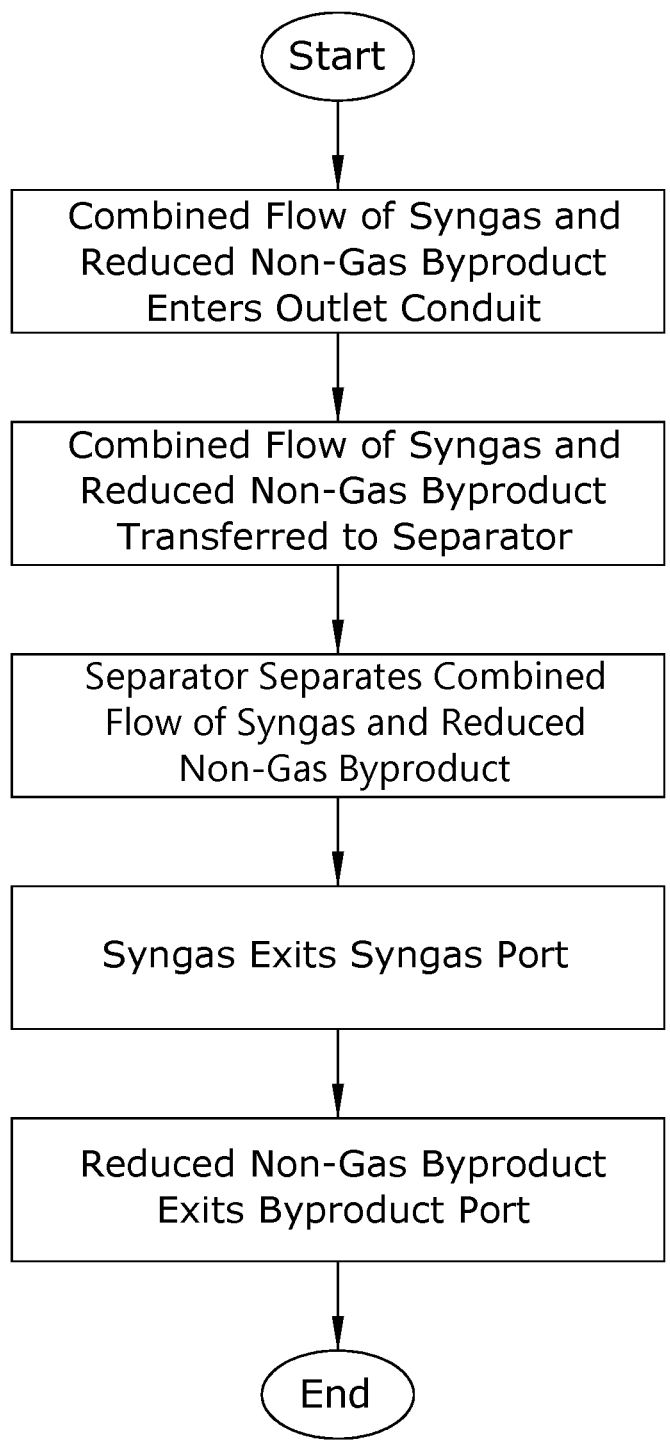
FIG. 22 is a flowchart illustrating an exemplary method of separating a reduced non-gas byproduct from a syngas.

FIG. 9 shows an exemplary embodiment of the outlet conduit 70 and outlet extension 73. The combined flow of the reduced non-gas byproduct 13 and the syngas will traverse through the outlet conduit 70 into the outlet extension 73. The outlet extension 73 terminates in an outlet port 74 where the combined flow of the reduced non-gas byproduct 13 and the syngas may be outputted to various other systems for other uses, such as to a separator 80 wherein the syngas may be separated from the reduced non-gas byproduct 13 as shown in FIGS. 19 and 22. The separator 80 may include a syngas port 82 through which the syngas exits the system 10. The reduced non-gas byproduct 13 may exit the separator 80 via a byproduct port 82 and the separated reduced non-gas byproduct 13 may be collected in a char or waste bin for removal/disposal. Build-up of reduced non-gas byproduct 13 within the outlet conduit 70 may be cleaned out via a clean-out port 71 on the distal end of the outlet conduit 70.

Unless otherwise defined, all technical and scientific terms used herein have the same meaning as commonly understood by one of ordinary skill in the art to which this invention belongs. Although methods and materials similar to or equivalent to those described herein can be used in the practice or testing of the gasifier system, suitable methods and materials are described above. All publications, patent applications, patents, and other references mentioned herein are incorporated by reference in their entirety to the extent allowed by applicable law and regulations. The gasifier system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A gasifier system, comprising:
    a gasifier for gasifying a biomass material, wherein the gasifier comprises an inlet and an outlet, wherein the inlet of the gasifier is adapted to receive the biomass material, wherein the outlet of the gasifier is adapted to output a flow of a syngas and a non-gas byproduct, wherein the non-gas byproduct has an initial particle size; and
    a grinder including an inlet and an outlet, wherein the inlet of the grinder is fluidly connected to the outlet of the gasifier for receiving the flow from the outlet of the gasifier, wherein the grinder is adapted for grinding the non-gas byproduct from the gasifier into a reduced particle size, wherein the outlet of the grinder is adapted to output a combined flow of the syngas and the non-gas byproduct having the reduced particle size, wherein the reduced particle size of the non-gas byproduct is smaller than the initial particle size of the non-gas byproduct.

2. The gasifier system of claim 1, wherein the reduced particle size of the non-gas byproduct is reduced enough to be entrained with the syngas in the combined flow.

3. The gasifier system of claim 2, wherein the reduced particle size of the non-gas byproduct is no greater than 3/8 inches.

4. The gasifier system of claim 1, further comprising a separator connected to the outlet of the grinder to separate the non-gas byproduct having the reduced particle size from the syngas.

5. The gasifier system of claim 1, further comprising an auger connected between the gasifier and the grinder, wherein the auger is adapted to convey the non-gas byproduct from the gasifier into the grinder.

6. The gasifier system of claim 5, wherein the auger comprises a first portion and a second portion, wherein the first portion is adapted to convey the non-gas byproduct from the gasifier into the grinder, wherein the second portion is adapted to force the non-gas byproduct through the grinder.

7. The gasifier system of claim 6, wherein the first portion comprises a first fighting adapted for conveying the non-gas byproduct, wherein the second portion comprises a second fighting adapted for forcing the non-gas byproduct through the grinder.

8. The gasifier system of claim 6, wherein the first portion of the auger comprises a smaller diameter than the second portion of the auger.

9. The gasifier system of claim 1, wherein the grinder comprises a cone including a wide end and a narrow end.

10. The gasifier system of claim 9, wherein the cone comprises a plurality of openings for grinding the non-gas byproduct.

11. The gasifier system of claim 10, wherein the wide end of the cone is adapted to receive the non-gas byproduct having the initial particle size, wherein the openings of the cone are adapted to dispense the non-gas byproduct having the reduced particle size.

12. The gasifier system of claim 1, wherein the grinder comprises a roll crusher.

13. The gasifier system of claim 1, wherein the grinder comprises a jaw crusher.

14. The gasifier system of claim 1, further comprising an outlet conduit fluidly connected with the outlet of the grinder and an outlet extension which extends at a right angle from the outlet conduit to form a T-shape.

15. The gasifier system of claim 14, wherein a distal end of the outlet conduit comprises a clean-out port for the outlet conduit, wherein a distal end of the outlet extension comprises an outlet port for the combined flow of the syngas and the non-gas byproduct having the reduced particle size.

16. A method of using the gasifier system of claim 1, comprising:
    feeding the biomass material into the inlet of the gasifier;
    gasifying the biomass material within the gasifier;
    outputting the flow of the syngas and the non-gas byproduct from the outlet of the gasifier;
    transferring the flow of the syngas and the non-gas byproduct from the outlet of the gasifier into the inlet of the grinder;
    grinding the non-gas byproduct into the reduced particle size by the grinder; and outputting the combined flow of the syngas and the non-gas byproduct having the reduced particle size by the outlet of the grinder.

17. A method of grinding non-gas byproducts from gasification, comprising:
gasifying a biomass material within a gasifier to produce a flow of a syngas and a non-gas byproduct, wherein the non-gas byproduct has an initial particle size;
transferring the flow of the syngas and the non-gas byproduct from the gasifier into an inlet of a grinder;
grinding the non-gas byproduct into a reduced particle size by the grinder; and
outputting a combined flow of the syngas and the non-gas byproduct having the reduced particle size from an outlet of the grinder, wherein the reduced particle size of the non-gas byproduct is smaller than the initial particle size of the non-gas byproduct.

18. The method of claim 17, further comprising the step of conveying the non-gas byproduct from the gasifier into the inlet of the grinder by an auger.

19. The method of claim 18, further comprising the step of forcing the non-gas byproduct through the grinder by the auger to reduce the particle size of the non-gas byproduct.

* * * * *

UNITED STATES PATENT AND TRADEMARK OFFICE
CERTIFICATE OF CORRECTION

PATENT NO. : 10,047,308 B2  
APPLICATION NO. : 15/262910  
DATED : August 14, 2018  
INVENTOR(S) : Philip W. Appel et al.

Page 1 of 1

It is certified that error appears in the above-identified patent and that said Letters Patent is hereby corrected as shown below:

In the Claims

Claim 7, Column 12, Lines 26-30, "The gasifier system of claim 6, wherein the first portion comprises a first fighting adapted for conveying the non-gas byproduct, wherein the second portion comprises a second fighting adapted for forcing the non-gas byproduct through the grinder" should read --The gasifier system of claim 6, wherein the first portion comprises a first flighting adapted for conveying the non-gas byproduct, wherein the second portion comprises a second flighting adapted for forcing the non-gas byproduct through the grinder--

Signed and Sealed this  
Sixth Day of November, 2018

Andrei Iancu  
*Director of the United States Patent and Trademark Office*